US009187016B2

(12) United States Patent
Strong et al.

(10) Patent No.: US 9,187,016 B2
(45) Date of Patent: Nov. 17, 2015

(54) CHILD SEAT WITH BELT TENSIONING MECHANISM FOR IMPROVED INSTALLATION

(71) Applicant: Britax Child Safety, Inc., Fort Mill, SC (US)

(72) Inventors: Lynn Curtis Strong, Rock Hill, SC (US); Mark Gunter, York, SC (US); Scott Alan Reed, York, SC (US)

(73) Assignee: BRITAX CHILD SAFETY INC., Fort Mill, SC (US)

( * ) Notice: Subject to any disclaimer, the term of this patent is extended or adjusted under 35 U.S.C. 154(b) by 0 days.

(21) Appl. No.: 14/273,804

(22) Filed: May 9, 2014

(65) Prior Publication Data

US 2014/0246889 A1 Sep. 4, 2014

Related U.S. Application Data

(63) Continuation of application No. 13/602,846, filed on Sep. 4, 2012, now Pat. No. 8,845,022.

(51) Int. Cl.
*B60N 2/26* (2006.01)
*B60N 2/28* (2006.01)
*B60N 2/46* (2006.01)

(52) U.S. Cl.
CPC ........ *B60N 2/46* (2013.01); *B60N 2/286* (2013.01); *B60N 2/2824* (2013.01); *B60N 2/2851* (2013.01); *B60N 2/2863* (2013.01); *B60N 2/2887* (2013.01); *Y10T 29/49826* (2015.01)

(58) Field of Classification Search
USPC .................................................... 297/256.16
See application file for complete search history.

(56) References Cited

U.S. PATENT DOCUMENTS

| 5,186,063 A | 2/1993 | Nishizawa |
|---|---|---|
| 5,286,086 A | 2/1994 | Gunji |

(Continued)

FOREIGN PATENT DOCUMENTS

| AU | 2 657 097 A | 11/1997 |
|---|---|---|
| AU | 3 787 697 A | 3/1998 |

(Continued)

OTHER PUBLICATIONS

Office Action and translation from Patent Office of the Russian Federation for corresponding Russian Application No. 201339691/11, mailed Oct. 7, 2014.

(Continued)

*Primary Examiner* — Rodney B White
(74) *Attorney, Agent, or Firm* — Nelson Mullins Riley & Scarborough LLP

(57) ABSTRACT

A child seat including a tensioning mechanism for applying tension to a seat belt to more fully secure the child seat to a car seat is provided herein. The child seat includes a seat base defining a seat portion and a backrest portion and designed to receive an untensioned belt to secure the child seat to a car seat in an untensioned configuration. The child seat further includes a tensioning mechanism attached to the backrest portion and rotatable between a first position substantially adjacent to the backrest portion and a second position disposed therefrom. In the second position, the tensioning mechanism can receive a portion of the belt. In the first position, the tensioning mechanism is configured to apply tension to the portion of the received belt to secure the child seat to the car seat in a tensioned configuration. Methods of manufacturing child seats are also provided herein.

19 Claims, 14 Drawing Sheets

(56) References Cited

U.S. PATENT DOCUMENTS

| | | |
|---|---|---|
| 5,611,596 A | 3/1997 | Barley et al. |
| 5,671,971 A | 9/1997 | Koyanagi et al. |
| 5,791,359 A | 8/1998 | Lin et al. |
| 5,810,435 A | 9/1998 | Surot |
| 5,839,789 A | 11/1998 | Koledin |
| 5,902,015 A | 5/1999 | Allcock |
| 5,979,982 A | 11/1999 | Nakagawa |
| 6,024,408 A | 2/2000 | Bello et al. |
| 6,053,532 A | 4/2000 | Wilkins et al. |
| 6,092,869 A | 7/2000 | Ziv |
| 6,139,099 A | 10/2000 | Skold et al. |
| 6,152,528 A | 11/2000 | Van Montfort |
| 6,170,911 B1 | 1/2001 | Kassai et al. |
| 6,508,510 B2 | 1/2003 | Yamazaki |
| 6,539,590 B2 | 4/2003 | Ziv |
| 6,672,664 B2 | 1/2004 | Yanaka |
| 6,779,842 B2 | 8/2004 | McNeff |
| 6,902,194 B2 | 6/2005 | Russell et al. |
| 7,029,068 B2 | 4/2006 | Yoshida et al. |
| 7,059,676 B2 | 6/2006 | McNeff |
| 7,163,265 B2 | 1/2007 | Adachi |
| 7,195,315 B2 | 3/2007 | Rikhof |
| 7,258,189 B2 | 8/2007 | Kohama |
| 7,261,376 B2 | 8/2007 | Kespohl |
| 7,300,113 B2 | 11/2007 | Baloga et al. |
| 7,753,445 B2 | 7/2010 | Kassai et al. |
| 7,866,703 B2 | 1/2011 | Spahn et al. |
| 8,262,161 B2 | 9/2012 | Fritz et al. |
| 8,550,555 B2 * | 10/2013 | Fritz et al. ............ 297/256.16 X |
| 8,573,695 B2 | 11/2013 | Van Geer et al. |
| 8,690,244 B2 * | 4/2014 | Fritz et al. ............ 297/256.16 X |
| 8,845,022 B2 * | 9/2014 | Strong et al. ............ 297/256.16 |
| 2001/0004163 A1 | 6/2001 | Yamazaki |
| 2002/0043838 A1 | 4/2002 | Yanaka et al. |
| 2006/0006714 A1 | 1/2006 | Van Geer et al. |
| 2006/0091709 A1 | 5/2006 | Emmert |
| 2011/0272983 A1 | 11/2011 | Fritz et al. |
| 2012/0007397 A1 | 1/2012 | Fritz et al. |
| 2012/0007398 A1 | 1/2012 | Fritz et al. |

FOREIGN PATENT DOCUMENTS

| | | |
|---|---|---|
| AU | 1 821 800 A | 6/2000 |
| AU | 2 982 301 A | 11/2001 |
| AU | 2001-29823 B2 | 11/2001 |
| AU | 2003-296874 | 6/2004 |
| CA | 2049739 A1 | 2/1992 |
| CA | 2084321 A1 | 6/1993 |
| CA | 2247597 A1 | 3/2000 |
| CA | 2526156 A1 | 1/2005 |
| DE | 295 13 774 U1 | 1/1996 |
| DE | 297 15 020 U1 | 11/1997 |
| DE | 197 22 096 A1 | 12/1998 |
| EP | 0 200 411 A2 | 12/1986 |
| EP | 0 323 334 A1 | 7/1989 |
| EP | 0 732 235 A2 | 9/1996 |
| EP | 0 816 161 A1 | 1/1998 |
| EP | 0 822 115 A2 | 2/1998 |
| EP | 0853018 A1 | 7/1998 |
| EP | 0 931 693 A2 | 7/1999 |
| EP | 1110806 A1 | 6/2001 |
| EP | 1 199 213 A1 | 4/2002 |
| EP | 1232902 A2 | 8/2002 |
| EP | 1 344 678 A2 | 9/2003 |
| EP | 1344678 A2 | 9/2003 |
| EP | 1369296 A1 | 12/2003 |
| EP | 1 403 131 A2 | 3/2004 |
| EP | 1418085 A1 | 5/2004 |
| EP | 1 199 213 B1 | 9/2005 |
| EP | 1 623 868 A1 | 2/2006 |
| EP | 1 623 892 B1 | 2/2008 |
| EP | 1 623 868 B1 | 4/2008 |
| EP | 1 997 671 A2 | 12/2008 |
| EP | 1 407 922 B1 | 3/2009 |
| EP | 1 110 806 B2 | 4/2009 |
| EP | 2080664 A1 | 7/2009 |
| EP | 1 612 091 B1 | 12/2009 |
| EP | 2322379 A1 | 5/2011 |
| FR | 2 735 001 A1 | 12/1996 |
| JP | 2001180348 A | 7/2001 |
| WO | WO 97/39913 A1 | 10/1997 |
| WO | WO 98/06289 A1 | 2/1998 |
| WO | WO 00/09367 A2 | 2/2000 |
| WO | WO 00/21803 A1 | 4/2000 |
| WO | WO 00/30886 A2 | 6/2000 |
| WO | WO 2004/033251 A1 | 4/2004 |
| WO | WO 2005/000625 A2 | 1/2005 |

OTHER PUBLICATIONS

Office Action and translation from Korean Intellectual Property Office for corresponding Korean Application No. 10-2013-0105120, mailed Oct. 17, 2014.

Office Action of corresponding Canadian application No. 2,825,694 mailed Dec. 15, 2014.

Extended European Search Report and Written Opinion of co-pending application No. 14003614.6 mailed Mar. 5, 2015.

Patent Examination Report No. 1 of co-pending Australian application No. 2013221904 mailed Mar. 13, 2015.

Extended European Search Report for Application No. 13004238.5; dated Nov. 21, 2013.

U.S. Appl. No. 14/063,807, filed Oct. 25, 2013; entitled *Forward and Rearward Facing Child Seat with Belt Tensioning Mechanism for Improved Installation*; first named inventor: Strong.

U.S. Appl. No. 13/602,846, filed Sep. 4, 2012; In re: Strong.

Office Action for U.S. Appl. No. 13/602,846 dated Feb. 5, 2014.

Office action from Korean patent application No. 10-2013-0105120 mailed Apr. 28, 2015.

Office action from Chinese patent application No. 201310398750.4 mailed Jun. 15, 2015.

Search Report from Chinese patent application No. 201310398750.4 mailed Jun. 15, 2015.

* cited by examiner

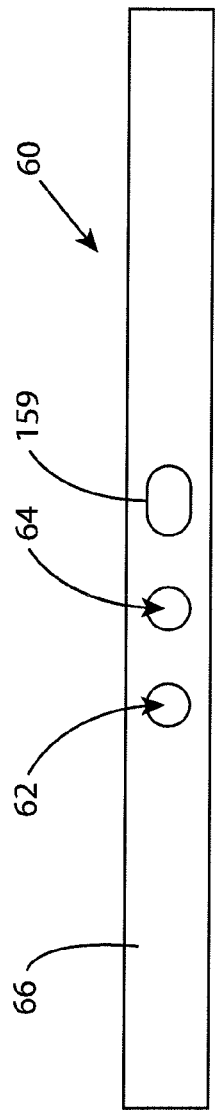
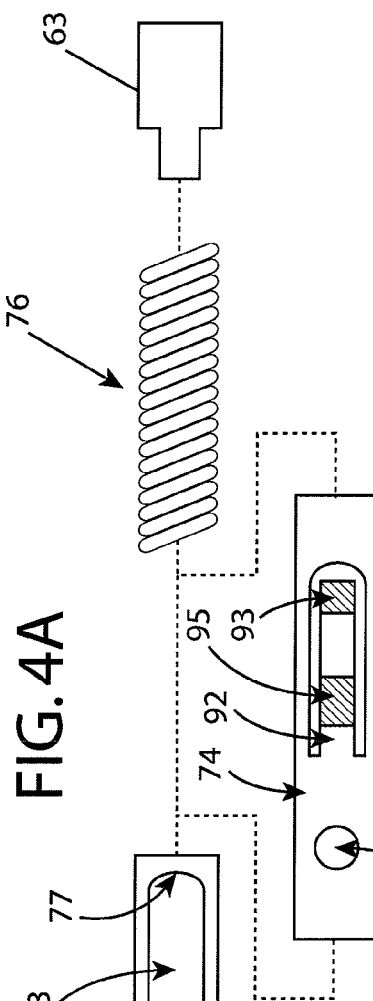
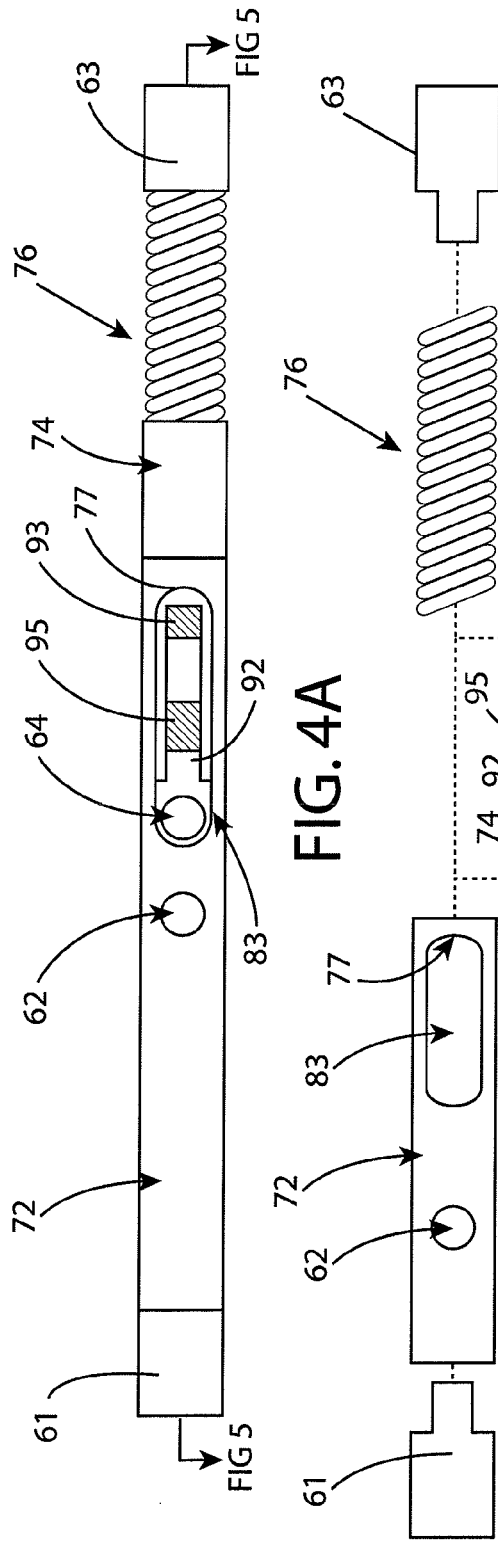
FIG. 4
FIG. 4A
FIG. 4B

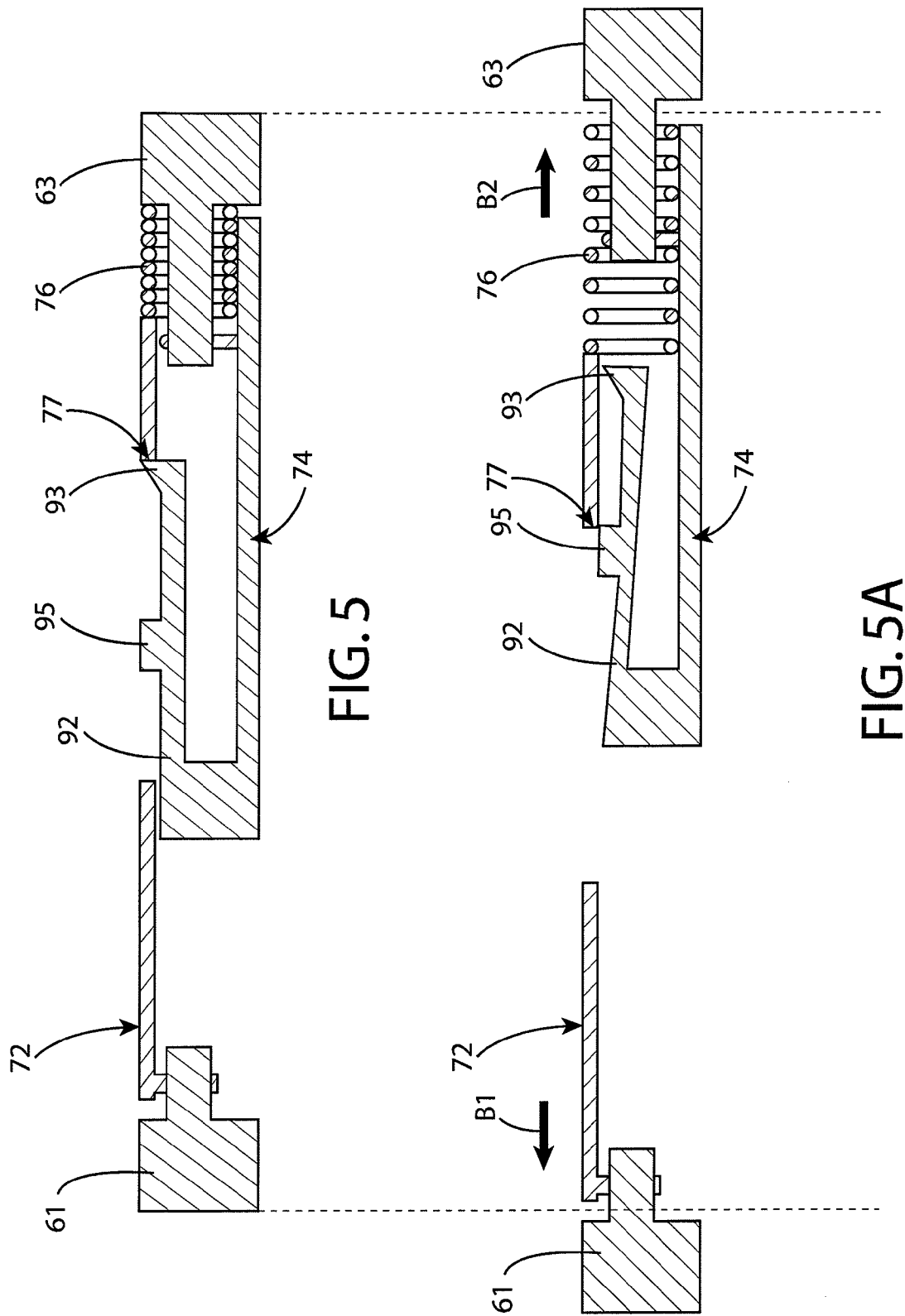

CHILD SEAT WITH BELT TENSIONING MECHANISM FOR IMPROVED INSTALLATION

CROSS-REFERENCES TO RELATED APPLICATION

This application is a continuation of U.S. patent application Ser. No. 13/602,846, entitled "Child Seat With Tensioning Mechanism For Improved Installation," filed Sep. 4, 2012, now U.S. Pat. No. 8,845,022, which is incorporated by reference herein in its entirety.

TECHNICAL FIELD

The present invention generally relates to the field of child safety seats, and more particularly, to a child safety seat including a tensioning mechanism for applying tension to a seat belt to more fully secure the child safety seat to a car seat, thereby providing for easier installation of the child safety seat to the car seat.

BACKGROUND

Child safety seating products are designed to protect children in vehicles from the effects of impacts or other sudden changes in motion (e.g., sudden deceleration). Child safety seats, commonly referred to simply as child seats, may be used in a variety of vehicles with a variety of seating configurations. It is important for a child safety seat to be properly secured to the car seat to protect the occupant, particularly during an impact.

SUMMARY

Some child safety seats are secured to a car seat with the seat belt of the car. In such situations, securing the child seat may be awkward and difficult. Moreover, maintaining a proper amount of tension in the seat belt can also be difficult. Indeed, an improper amount of tension is undesirable and may negatively affect the safety of the occupant secured within the child seat.

Example embodiments of the present invention seek to provide for easy installation of a child seat to a car seat. Additionally, some example embodiments seek to provide a mechanism for a child seat that applies tension to the seat belt to secure the child seat to the car seat in a fully secured or tensioned configuration. A child seat that is fully secured in a tensioned configuration provides increased safety for an occupant of the child seat.

In one example embodiment, a child seat configured to be secured to a car seat is provided. The child seat comprises a seat base defining a seat portion and a backrest portion. The seat base is configured to receive an untensioned belt of the car seat to secure the child seat to the car seat in an untensioned configuration. The belt defines a lap section and a shoulder section. The child seat further comprises a tensioning mechanism attached to the backrest portion of the seat base. The tensioning mechanism is rotatable between a first position substantially adjacent to the backrest portion of the seat base and a second position disposed therefrom. In the second position, the tensioning mechanism is configured to receive a portion of the lap section of the belt and a portion of the shoulder section of the belt. In the first position, the tensioning mechanism is configured to apply tension to the portion of the lap section and the portion of the shoulder section of the belt to secure the child seat to the car seat in a tensioned configuration.

In some embodiments, the tensioning mechanism is configured to rotate, in response to receiving a substantially vertical force, from the second position to the first position to apply tension to the portion of the lap section and the portion of the shoulder section of the belt to secure the child seat to the car set in a tensioned configuration.

In some embodiments, the seat base further defines a first arm rest and a second arm rest. A top surface of each arm rest extends in a first horizontal plane. In the second position, a bottom surface of the tensioning mechanism extends in a second horizontal plane. The second horizontal plane is above the first horizontal plane such that the top surface of each arm rest and the bottom surface of the tensioning mechanism define a belt guide channel configured to allow a user to position the portion of the lap section and the portion of the shoulder section of the belt therebetween. Additionally, in some embodiments, each arm rest defines a curved surface that is configured to guide the portion of the lap section and the portion of the shoulder section of the belt into engagement with the tensioning mechanism when the tensioning mechanism is disposed in the second position.

In some embodiments, the seat base further defines a first arm rest and a second arm rest. Each arm rest defines an angled surface proximate the backrest portion, wherein the angled surface is configured to adjacently engage and align the portion of the lap section and the portion of the shoulder section of the belt when the child seat is in the tensioned configuration.

In some embodiments, the child seat further comprises a harness defining a first belt and a second belt. The first belt and the second belt each extend from the backrest portion at a first end to a second end that is fixedly attached to the tensioning mechanism. The second ends of the first belt and the second belt of the harness are each configured to rotate with the tensioning mechanism between the first position and the second position.

In some embodiments, the seat base further defines opposing side portions. Each side portion comprises a lock receiving portion. The tensioning mechanism further comprises a locking mechanism comprising two laterally-opposing locking members configured to translate between an extended position and a retracted position. Each lock receiving portion is configured to receive a respective locking member when the tensioning mechanism is in the first position and the locking members are in the extended position, thereby locking the tensioning mechanism in the first position. The locking members are configured to automatically translate to the extended position when the tensioning mechanism is rotated from the second position to the first position.

Additionally, in some embodiments, the locking members are biased toward the extended position. The locking mechanism comprises a retaining member and a trigger member. The retaining member is configured to retain the locking members in the retracted position. The trigger member is configured to interact with the backrest portion of the seat base when the tensioning mechanism is rotated to the first position to move the trigger member from a trigger position to a withdrawn position. The trigger member is configured to cause the retaining member to release the locking members in the withdrawn position.

Additionally, in some embodiments, the locking mechanism comprises a latch configured to enable a user to translate the locking members from the extended position to the retracted position. In some embodiments, the latch defines two pockets that are configured to each receive a finger of a user. The two pockets are configured to translate toward each other to cause the locking members to move from the extended position to the retracted position.

Additionally, in some embodiments, the seat base defines a ramp proximate each lock receiving portion. The ramp is configured to engage and at least partially retract the locking members from the extend position to enable the tensioning mechanism to rotate from the second position to the first position.

In some embodiments, the child seat further comprises a padding attached to the backrest portion of the seat base. The padding is configured to at least partially cover the tensioning mechanism in the first position. The padding is configured to fold as the tensioning mechanism rotates from the first position to the second position.

In another example embodiment, a child seat configured to be secured to a car seat is provided. The child seat comprises a seat base defining a seat portion and a backrest portion. The seat base is configured to receive an untensioned belt of the car seat to secure the child seat to the car seat in an untensioned configuration. The seat base further defines opposing side portions. Each side portion comprises a lock receiving portion. The child seat further comprises a tensioning mechanism attached to the backrest portion of the seat base. The tensioning mechanism is rotatable between a first position substantially adjacent to the backrest portion of the seat base and a second position disposed therefrom. In the second position, the tensioning mechanism is configured to receive a portion of the belt. In the first position, the tensioning mechanism is configured to apply tension to the portion of the belt to secure the child seat to the car seat in a tensioned configuration. The tensioning mechanism further comprises a locking mechanism comprising two laterally-opposing locking members configured to translate between an extended position and a retracted position. Each lock receiving portion is configured to receive a respective locking member when the tensioning mechanism is in the first position and the locking members are in the extended position, thereby locking the tensioning mechanism in the first position. The locking members are configured to automatically translate to the extended position when the tensioning mechanism is rotated from the second position to the first position.

In yet another example embodiment, a method for manufacturing a child seat configured to be secured to a car seat is provided. The method comprises providing a seat base defining a seat portion and a backrest portion. The seat base is configured to receive an untensioned belt of the car seat to secure the child seat to the car seat in an untensioned configuration. The belt defines a lap section and a shoulder section. The method further comprises attaching a tensioning mechanism to the seat base. The tensioning mechanism is rotatable between a first position substantially adjacent to the backrest portion of the seat base and a second position disposed therefrom. In the second position, the tensioning mechanism is configured to receive a portion of the lap section of the belt and a portion of the shoulder section of the belt. In the first position, the tensioning mechanism is configured to apply tension to the portion of the lap section of the belt and the portion of the shoulder section of the belt to secure the child seat to the car seat in a tensioned configuration.

In another example embodiment, a method for manufacturing a child seat configured to be secured to a car seat is provided. The method comprises providing a seat base defining a seat portion and a backrest portion. The seat base is configured to receive an untensioned belt of a car seat to secure the child seat to the car seat in an untensioned configuration. The seat base further defines opposing side portions. Each side portion comprises a lock receiving portion. The method further comprises attaching a tensioning mechanism to the seat base. The tensioning mechanism is rotatable between a first position substantially adjacent to the backrest portion of the seat base and a second position disposed therefrom. In the second position, the tensioning mechanism is configured to receive a portion of the belt. In the first position, the tensioning mechanism is configured to apply tension to the portion of the belt to secure the child seat to the car seat in a tensioned configuration. The tensioning mechanism further comprises a locking mechanism comprising two laterally-opposing locking members configured to translate between an extended position and a retracted position. Each lock receiving portion is configured to receive a respective locking member when the tensioning mechanism is in the first position and the locking members are in the extended position, thereby locking the tensioning mechanism in the first position. The locking members are configured to automatically translate to the extended position when the tensioning mechanism is rotated from the second position to the first position.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4 shows a top view of a locking mechanism for the tensioning mechanism shown in FIG. 3, in accordance with an example embodiment of the present invention described herein;

FIG. 4A shows a top view of the locking mechanism shown in FIG. 4 with the outer sleeve of the locking mechanism removed, in accordance with an example embodiment of the present invention described herein;

FIG. 4B shows an exploded view of the locking mechanism shown in FIG. 4A, in accordance with an example embodiment of the present invention described herein;

FIG. 5 shows a cross-sectional view of the locking mechanism shown in FIG. 4A with the locking members of the locking mechanism in the retracted position, in accordance with an example embodiment of the present invention described herein;

FIG. 5A shows a cross-sectional view of the locking mechanism shown in FIG. 4A with the locking members of the locking mechanism in the extended position, in accordance with an example embodiment of the present invention described herein;

Figure 6:
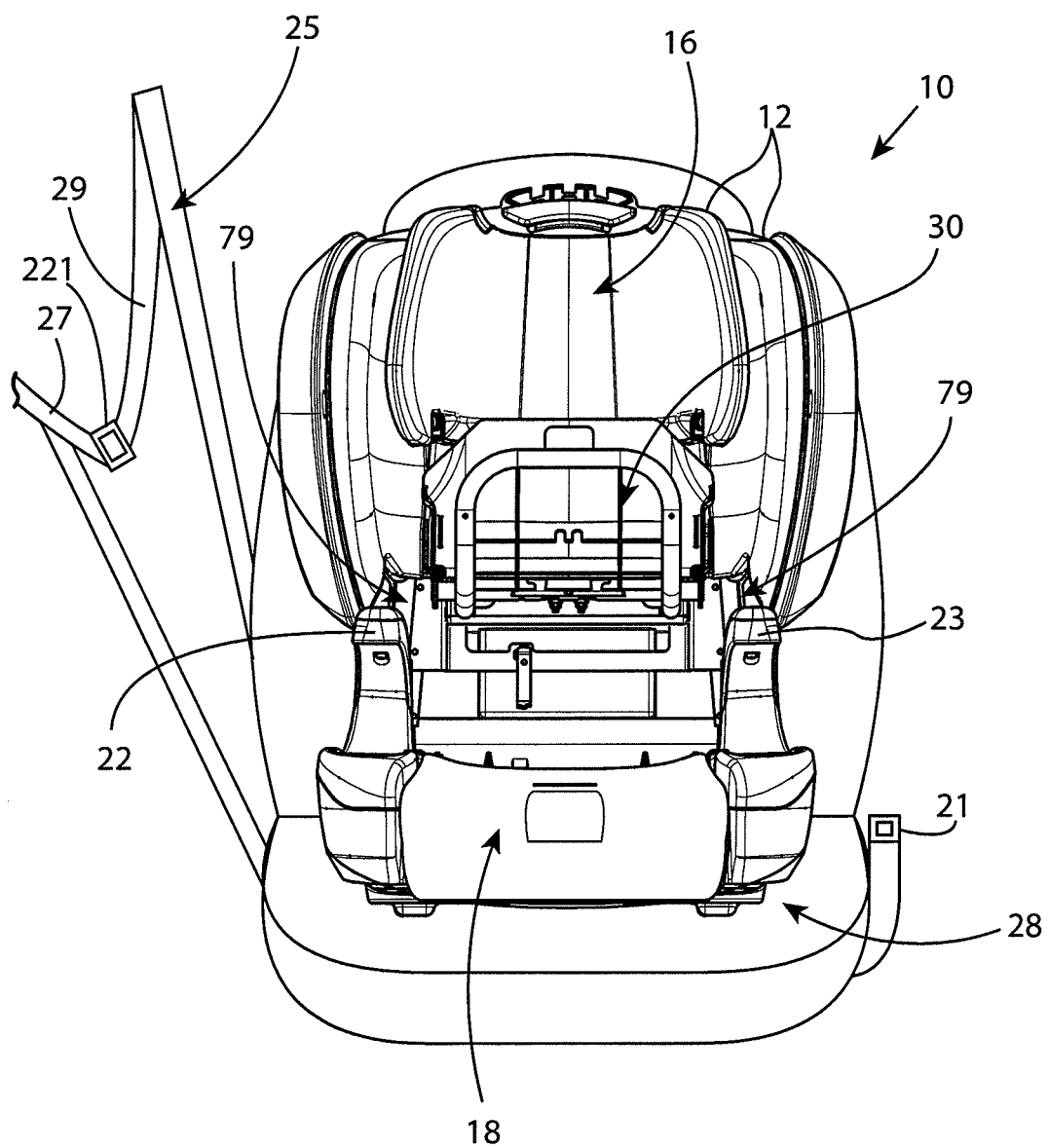
FIG. 6 shows a front view of the child seat shown in FIG. 3, wherein the child seat is positioned on a car seat near a seat belt, in accordance with an example embodiment of the present invention described herein.
Figure 6A:
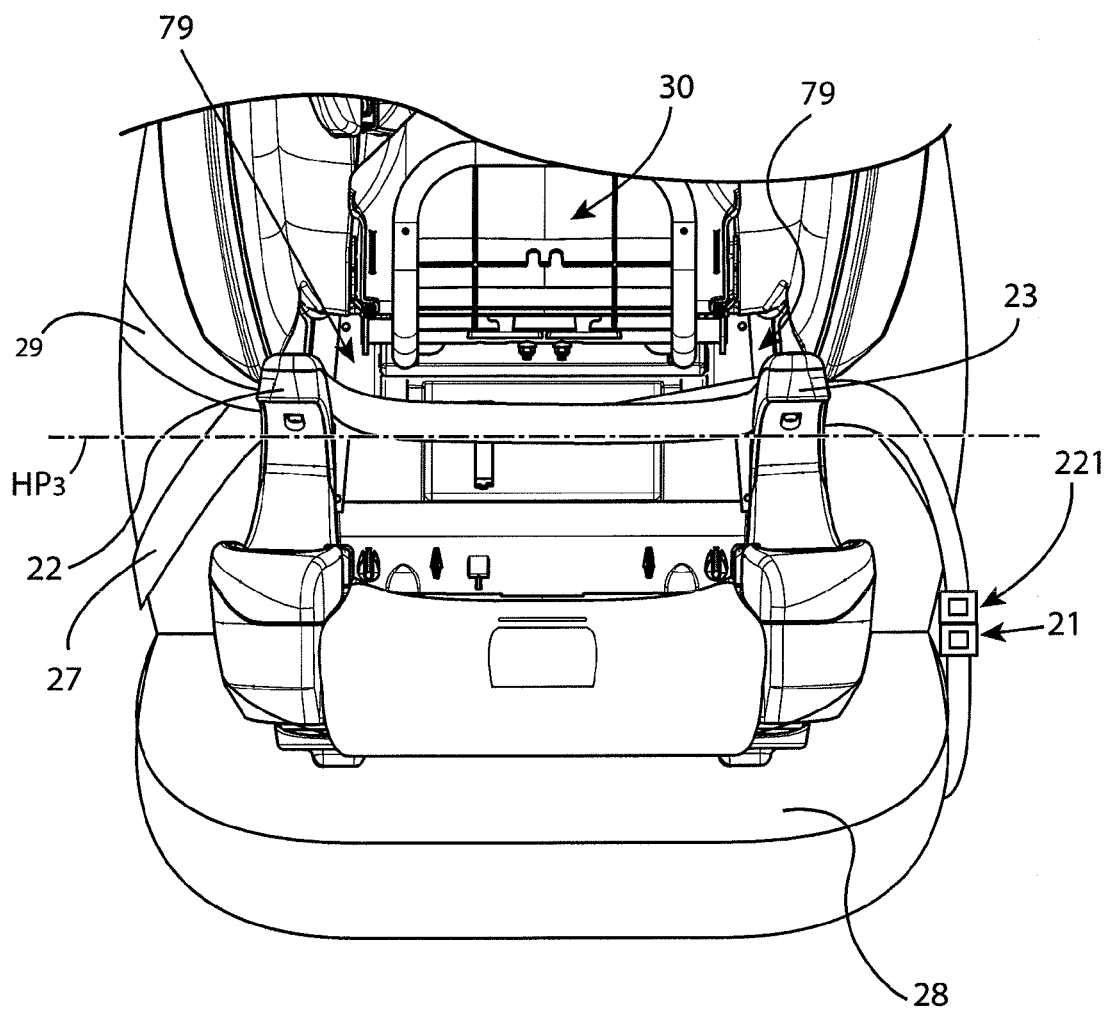
FIG. 6A shows a detailed view of the child seat shown in FIG. 6 with a portion of the seat belt positioned over the arm rests of the child seat and under the tensioning mechanism and the seat belt latched to a buckle of the car seat in the untensioned configuration, in accordance with an example embodiment of the present invention described herein.
Figure 7:
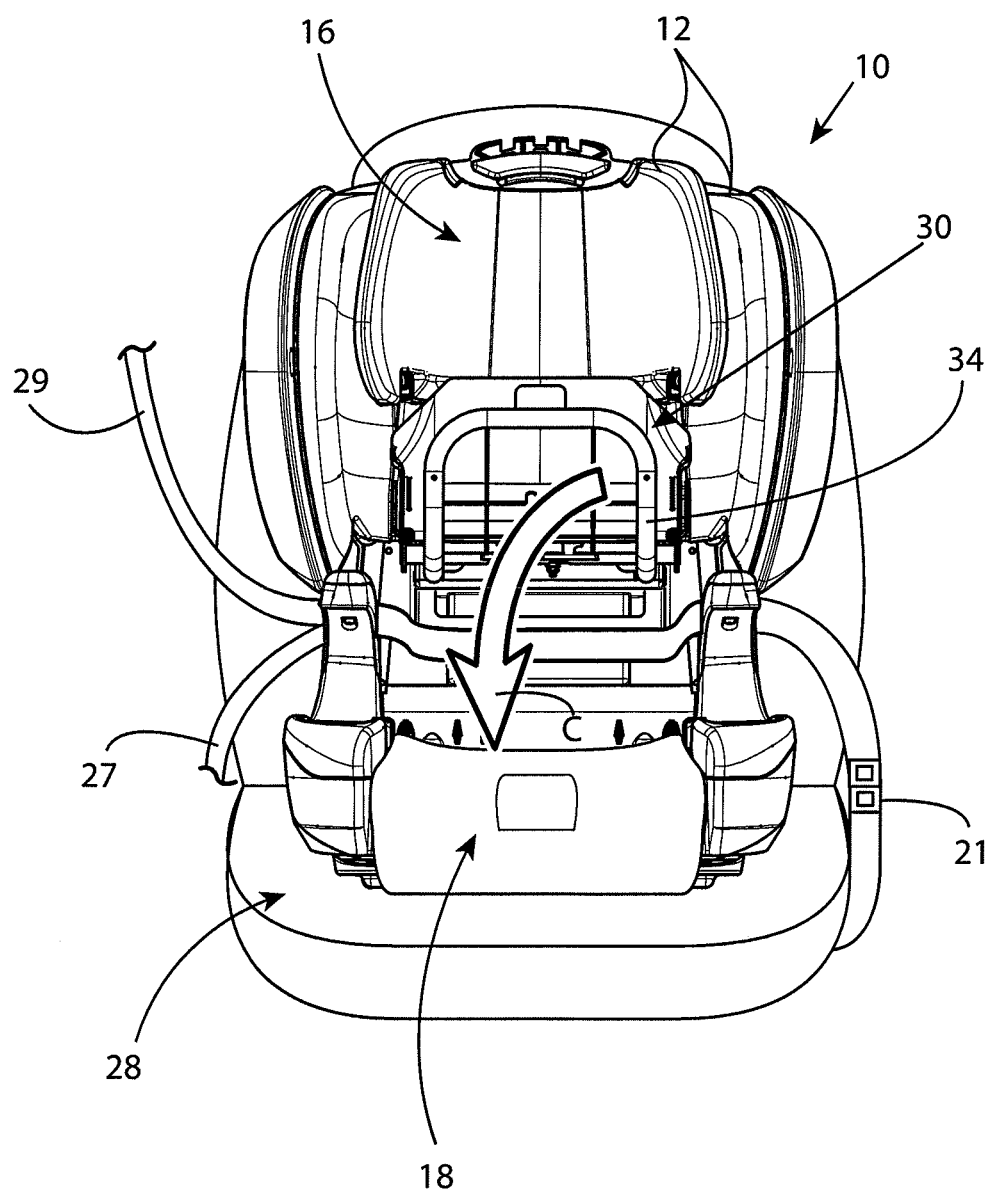
Figure 7A:
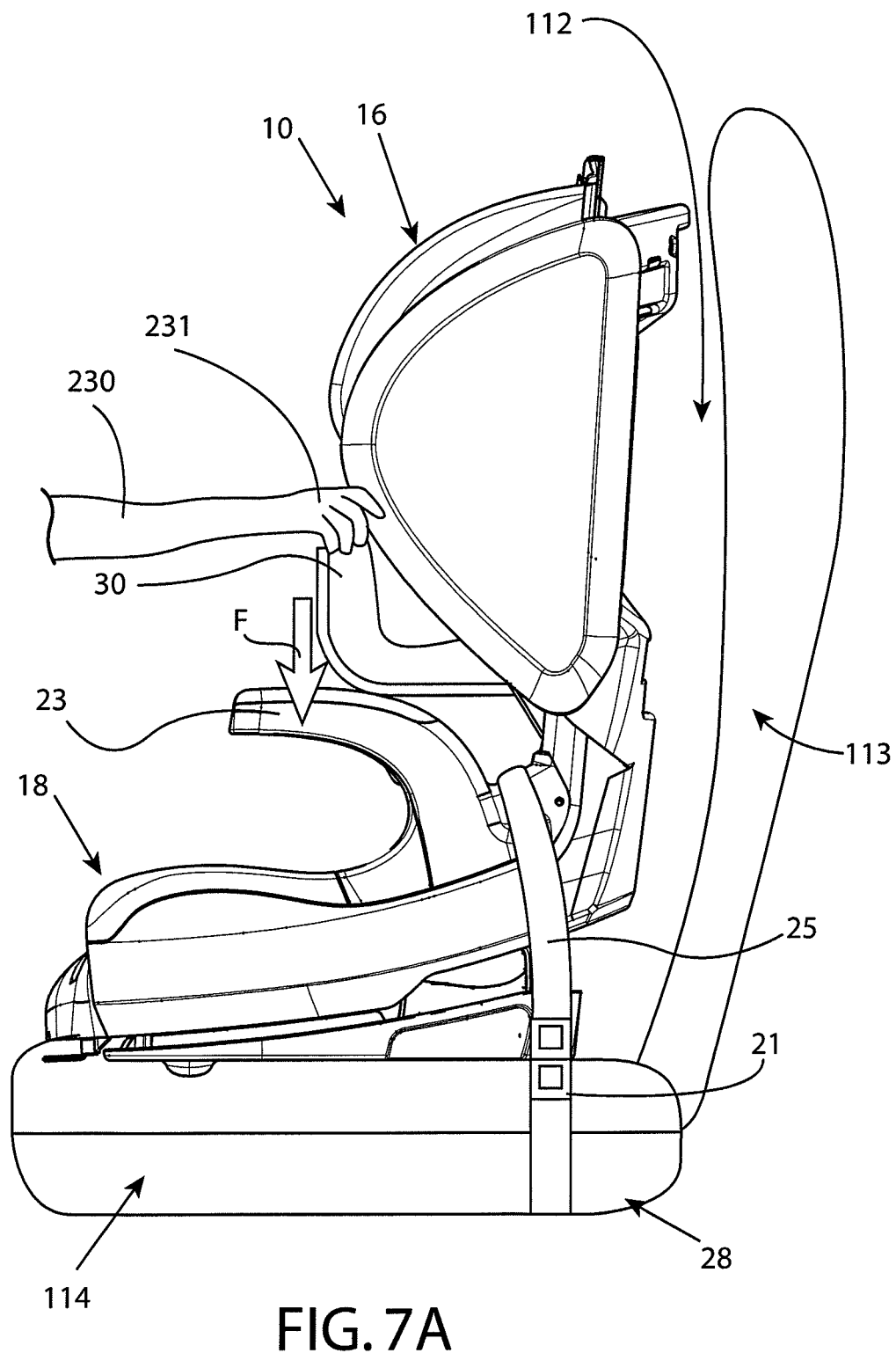
Figure 8:
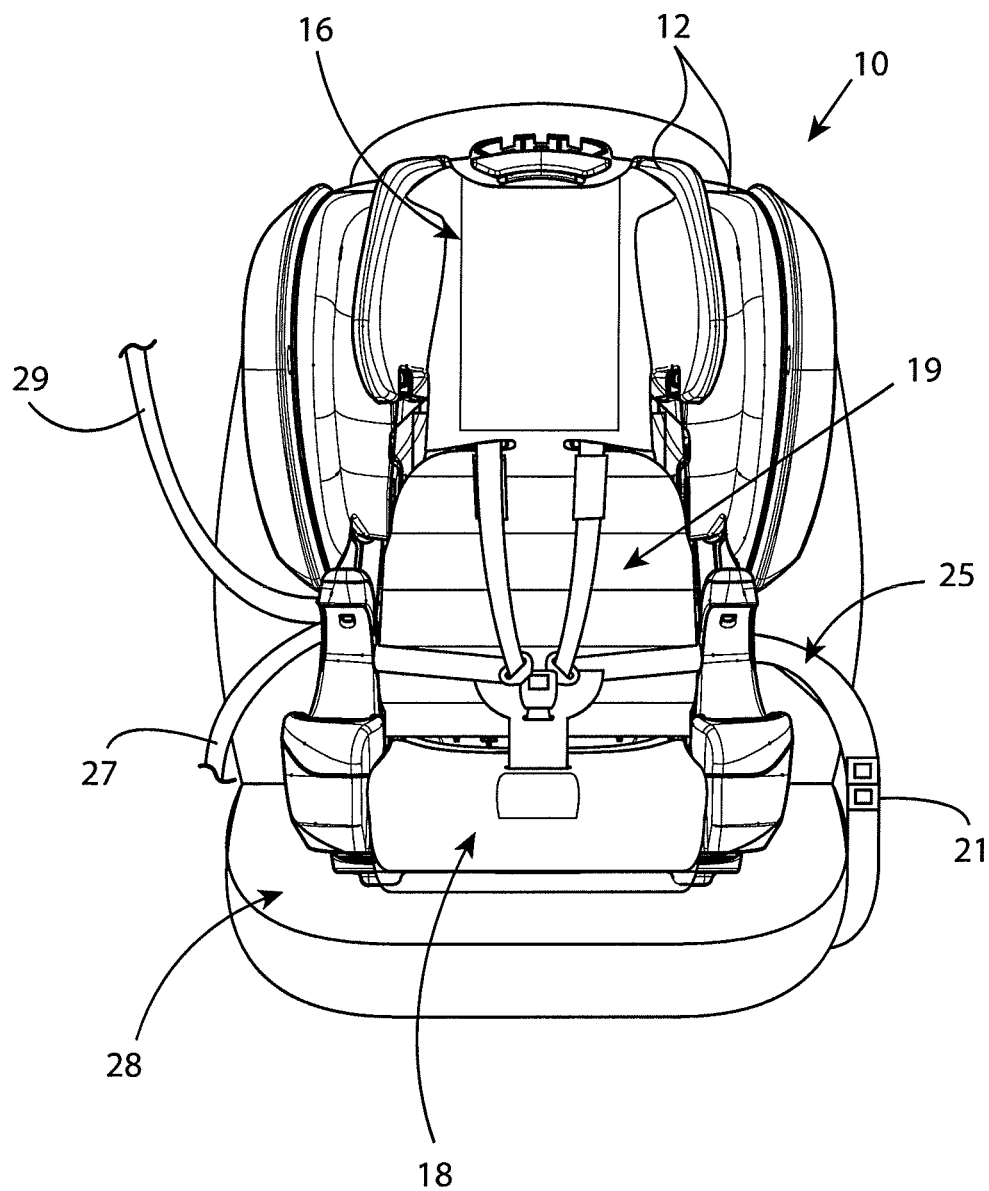
Figure 8A:
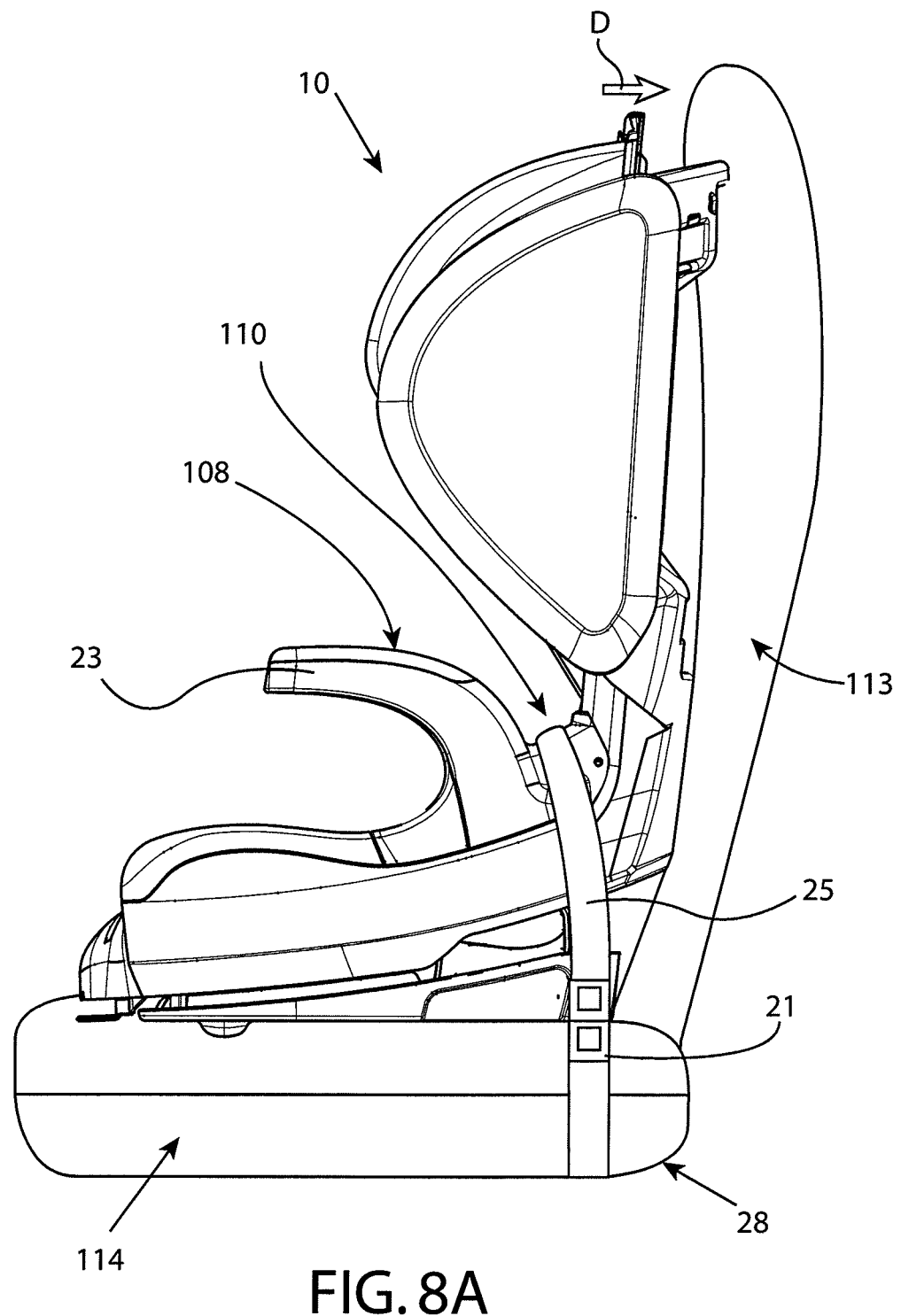

FIG. 7 shows a front view of the child seat shown in FIG. 6A with an arrow indicating rotation of the tensioning mechanism after the seat belt has been positioned over the arm rests of the child seat and under the tensioning mechanism and the seat belt latched to a buckle of the car seat in the untensioned configuration, in accordance with an example embodiment of the present invention described herein;

FIG. 7A shows a side view the child seat shown in FIG. 7, in accordance with an example embodiment of the present invention described herein;

FIG. 8 shows a front view of the child seat shown in FIG. 7, where the tensioning mechanism has been rotated into the first position to apply tension to the seat belt to secure the child seat to the car seat in a tensioned configuration, in accordance with an example embodiment of the present invention described herein; and FIG. 8A shows a side view the child seat shown in FIG. 8, in accordance with an example embodiment of the present invention described herein.

DETAILED DESCRIPTION OF THE INVENTION

The present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements.

A child safety seat may be configured for installation in a forward-facing position to accommodate children in the appropriate position based on the height and weight of a child, such as according to the guidelines and standards of the United States National Highway Transportation Safety Administration (NHTSA) and similar authorities in other countries.

In order to protect an occupant, a child safety seat must be secured to a fixed location in a vehicle. The type of securement depends on the type of vehicle and may also depend on the standards for the particular region the vehicle is being operated in. For example, a child safety seat may be secured to a vehicle using a variety of methods, including using the seat belt of the car seat or LATCH (Lower Anchors and Tethers for Children) attachments in the U.S.

Proper installation and use of a child safety seat within a vehicle is necessary to achieve the maximum protection afforded by the seat. As noted above, some child safety seats are designed to secure to a vehicle seat using the seat belt of the vehicle seat. Often a seat belt can be positioned around the child seat and then fastened (e.g., latched) into a buckle attached to the vehicle to achieve secure attachment of the child seat to the vehicle. However, even when the seat belt is tightly fastened, slack in the seat belt may occur. Indeed, the seat belt may not be fully tensioned and the child seat may be loosely secured to the vehicle, which may be unsafe for an occupant. In some cases, multiple attempts to fully secure a child seat to a vehicle seat using a seat belt may be required. As such, installation of a child seat using a vehicle seat belt can be difficult and time consuming.

Accordingly, some example embodiments of the present invention provide a tensioning mechanism for easy and intuitive securing of a child seat using a vehicle seat belt. The tensioning mechanism enables a user to easily apply tension to (e.g., remove slack from) a latched seat belt during installation of the child seat to the vehicle seat. This causes the child seat to become more fully secured to the vehicle seat (e.g., the child seat enters a tensioned configuration).

Figure 1:
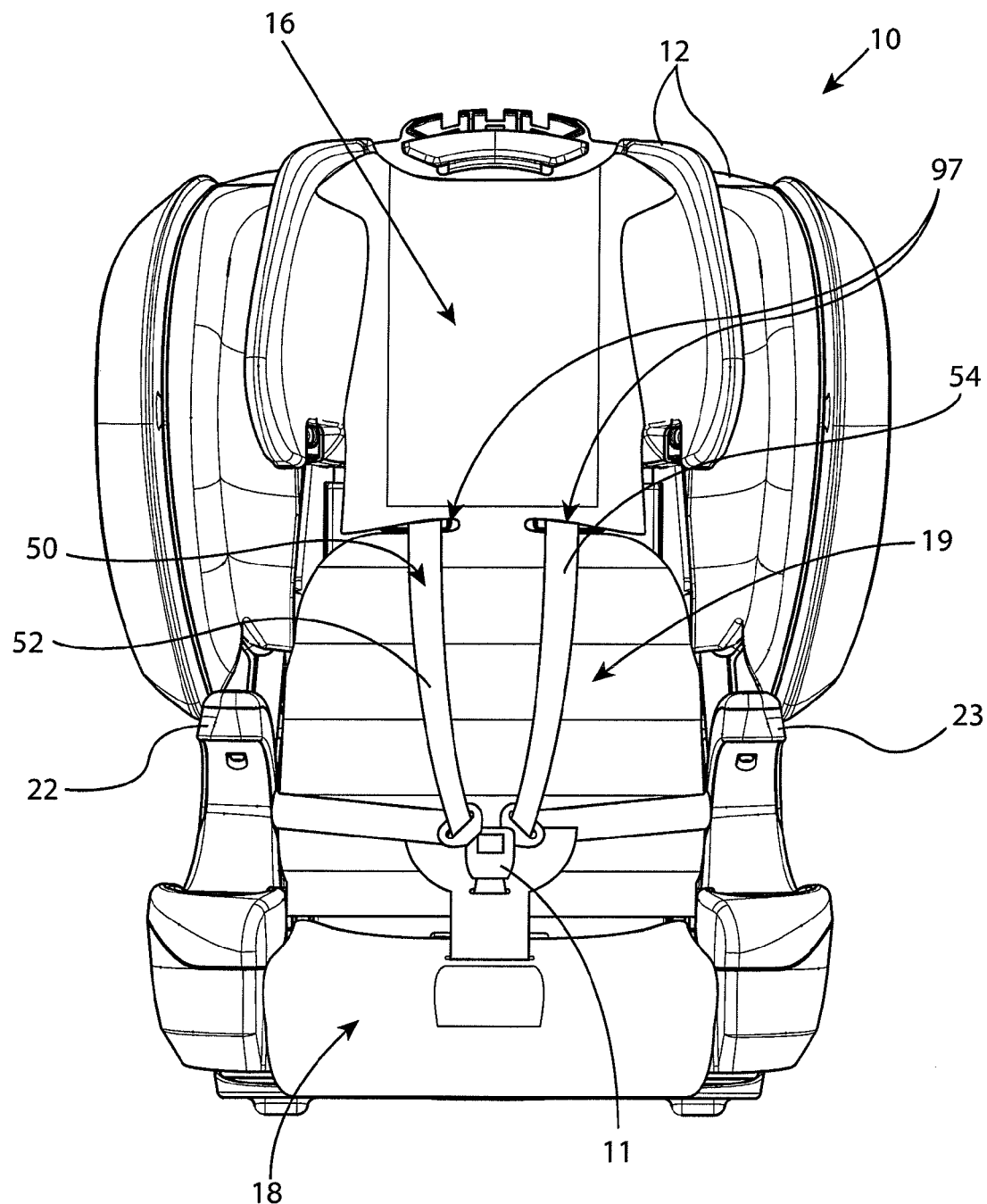
FIG. 1 shows a front view of a child safety seat, in accordance with an example embodiment of the present invention described herein.

FIG. 1 illustrates an example child safety seat 10 configured to be secured to a car seat 28 (shown in FIG. 6). The child seat 10 comprises a seat base 12 defining a seat portion 18 and a backrest portion 16. The seat portion 18 and backrest portion 16 may define a seat shape that is configured to receive an occupant, such as a child. Additionally, in some embodiments, the child seat 10 may comprise a harness 50 that is configured to secure the occupant within the child seat 10. In such a manner, an occupant, such as a child (not shown), may be positioned within and secured to the child seat 10, such as for safety purposes.

Figure 1A:
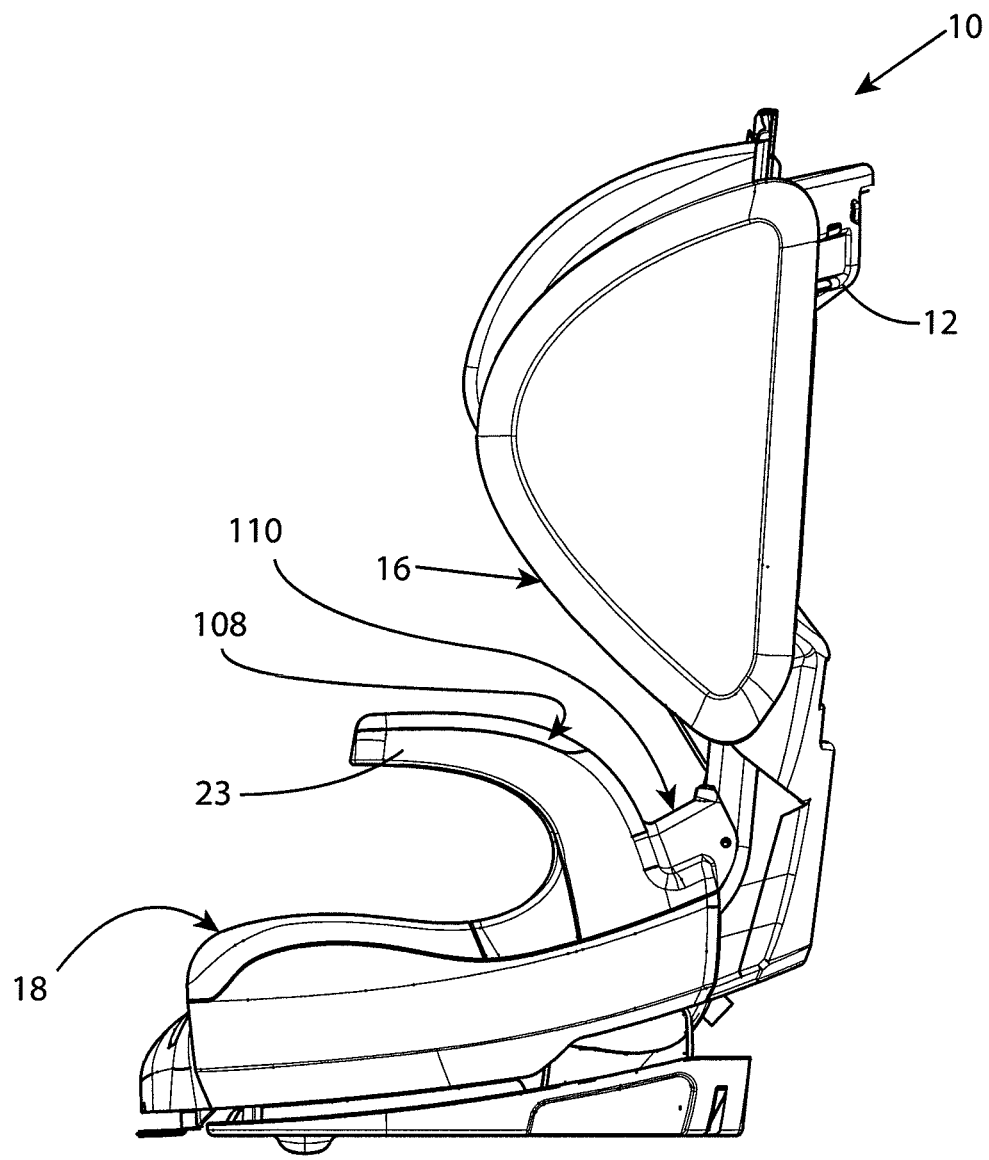
FIG. 1A shows a side view of the child safety seat shown in FIG. 1, in accordance with an example embodiment of the present invention described herein.

In some embodiments, the child seat 10 may comprise arm rests for the occupant. In the depicted embodiment, the seat base 12 defines a first arm rest 22 and a second arm rest 23. With reference to FIG. 1A, each arm rest 22, 23 may extend outwardly from the seat base 12 to enable the occupant to rest their arms while being secured within the child seat 10.

In some embodiments, each arm rest 22, 23 may define a curved surface 108. Additionally, in some embodiments, each arm rest 22, 23 may define an angled surface 110 that extends from the backrest portion 16 of the seat base 12 downwardly at an angle (e.g., at approximately a 45° angle down from the backrest portion 16 of the seat base 12). Such features provide an aesthetic and ornamental design to the arm rest.

In some embodiments, the child seat may comprise padding, cushions, or other features to provide comfort and/or additional safety for an occupant. With reference to FIG. 1, in some embodiments, the child seat 10 may comprise a padding 19 that is attached to the backrest portion 16 of the seat base 12. As noted above, the padding 19 may provide additional support and comfort for a seat occupant. In some embodiments, the padding 19 may be configured to at least partially cover a tensioning mechanism 30 (shown in FIG. 2). Additionally, in some embodiments, the padding 19 may be configured to fold, rotate, be removed, or otherwise be displaced to reveal the tensioning mechanism 30. Additionally, as will be described in greater detail herein, in some embodiments, the padding 19 may be configured to fold as the tensioning mechanism 30 rotates from a first position to a second position.

In some embodiments, the child seat 10 may comprise a tensioning mechanism 30 that, as described in greater detail herein, is configured to enable a user to more easily secure the child seat to a car seat in a tensioned configuration. In such a manner, the child seat may be more fully secures to the car seat and provide optimal protection to an occupant, such as during a vehicle impact. The tensioning mechanism 30 may be pivotably attached to the backrest portion 16 of the seat base 12. In such a manner the tensioning mechanism 30 may be rotatable between a first position (shown in FIGS. 1 and 2), in which the tensioning mechanism 30 is substantially flush/ aligned with the backrest portion 16, and a second position (shown in FIG. 3) in which the tensioning mechanism 30 is at least partly displaced from the backrest portion 16.

Figure 2:
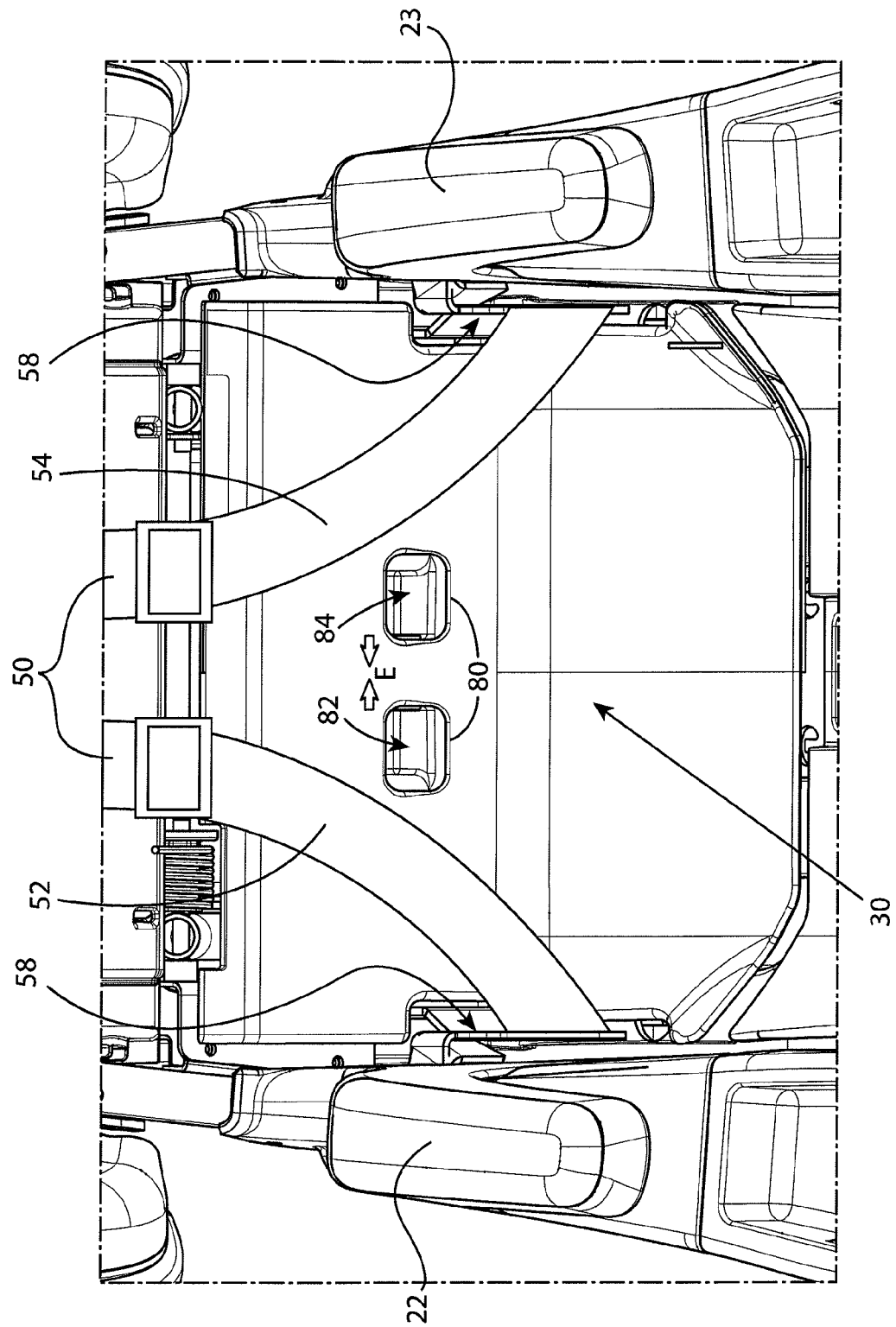
FIG. 2 shows a detailed view of a tensioning mechanism of the child seat shown in FIG. 1 with the tensioning mechanism disposed in the first position, in accordance with an example embodiment of the present invention described herein.

With reference to FIG. 1, the padding 19 may be removed or folded upward to reveal the tensioning mechanism 30. As shown in FIG. 2, the tensioning mechanism 30 is disposed in the first position which, in the depicted embodiment, is substantially adjacent to the backrest portion 16 of the seat base 12. In such an embodiment, in the first position, the tensioning mechanism 30 is fully contained within the profile of the seat base 12, thereby keeping the tensioning mechanism 30 from protruding into the space of the child seat 10 reserved for the occupant.

In some embodiments, the tensioning mechanism 30 may be configured to enable a user to rotate the tensioning mechanism 30 out of the first position from within the backrest portion 16 of the seat base 12. In the depicted embodiment, the tensioning mechanism 30 comprises a latch 80 that is configured to enable a user to rotate the tensioning mechanism 30 from the first position toward the second position. The latch 80 may define two pockets 82, 84 that are each configured to receive a finger of a user. The two pockets 82, 84 may be further configured to translate toward each other to enable a user to interact with the tensioning mechanism 30, such as to rotate the tensioning mechanism 30 from the first position to the second position.

In some embodiments, as will be described in greater detail herein, the latch 80 may be configured to enable a user to retract or otherwise unlock the locking members 61, 63 of a locking mechanism 60 (shown in FIG. 4A) to release the tensioning mechanism 30 from the first position. The two pockets 82, 84 of the latch 80 may be configured to translate toward each other to retract or otherwise unlock the locking members 61, 63. Then, due to a bias, such as from spring 91 shown in FIG. 3B, the tensioning mechanism 30 may automatically rotate out of the first position and into the second position. In such example embodiments, the user may not be required to manually rotate the tensioning mechanism 30 and may simply retract or otherwise unlock the locking members 61, 63 to release the tensioning mechanism 30.

As noted with respect to FIG. 1, in some embodiments, the child seat 10 may comprise a harness 50. The harness 50 may define a first belt portion 52 and a second belt portion 54. The first belt portion 52 and second belt portion 54 may attach or otherwise engage the seat base 12 at a first end 97. Additionally, with reference to FIG. 2, the first belt portion 52 and second belt portion 54 may also attach or otherwise engage the tensioning mechanism 30 at a second end 58. The harness 50 may be configured to surround an occupant, such as a child (not shown), who is positioned within the child seat 10. Additionally, the harness 50 may be configured to latch to a harness buckle 11 (shown in FIG. 1) connected to the child seat 10 (e.g., the seat base 12) to secure the occupant to the child seat 10.

Figure 3:
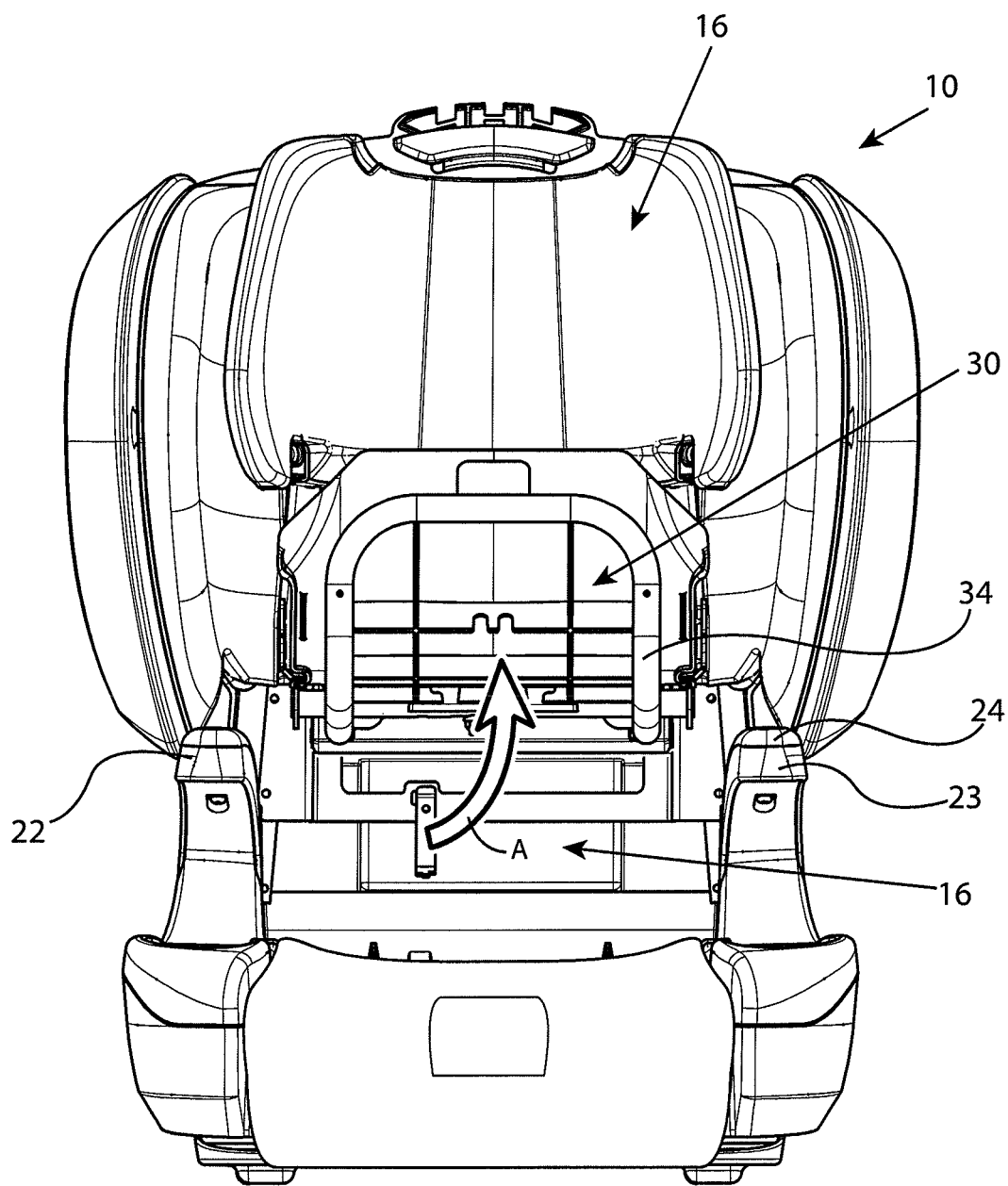
FIG. 3 shows a front view of the child seat shown in FIG. 1, where the tensioning mechanism has been rotated into the second position, in accordance with an example embodiment of the present invention described herein.

As noted above, in some embodiments, the tensioning mechanism 30 may be configured to rotate from a first position to a second position. In some embodiments, with reference to FIG. 3, the tensioning mechanism 30 may be rotated (e.g., in the direction of arrow A) from the first position substantially adjacent to the backrest portion 16 of the seat base 12 (FIGS. 1 and 2) to the second position (FIG. 3). In the depicted embodiment, the tensioning mechanism 30 is disposed away from the backrest portion 16 of the seat base 12 when in the second position.

In embodiments of the child seat with a harness 50, the harness 50 may define a first belt portion 52 and a second belt portion 54 that each extend from the backrest portion 16 of the seat base 12 at a first end 97 (shown in FIG. 1) to a second end 58 fixedly attached to the tensioning mechanism 30 (shown in FIG. 2). Being fixedly attached to the tensioning mechanism 30, the second end 58 and the harness 50 may rotate with the tensioning mechanism 30 between the first position and the second position. In such a manner, the harness 50, including the first belt portion 52 and the second belt portion 54, and the second end 58 may be removed from the area below the tensioning mechanism 30. Additionally, in some embodiments, the padding 19 may also be folded up with the harness 50 and, thus, may also be removed from the area below the tensioning mechanism 30. As described in greater detail herein, such a feature enables a user to have clear and easy access to the belt guide channel 79 (shown in FIG. 3A) and allows for easy positioning of the seat belt 25 (shown in FIG. 6) under the tensioning mechanism 30.

As noted herein, some embodiments of the present invention provide a tensioning mechanism for applying tension to a seat belt of a vehicle to more fully secure the child seat with the vehicle. In the depicted embodiment of FIG. 3, the tensioning mechanism 30 has been rotated into the second position to provide an area for a user to position a seat belt of a vehicle under the tensioning mechanism 30 for securing the child seat 10 to the vehicle. Positioning and engagement of the seat belt of the vehicle will be described in greater detail herein with respect to FIGS. 6, 6A, 7, 7A, 8, and 8A.

Figure 3A:
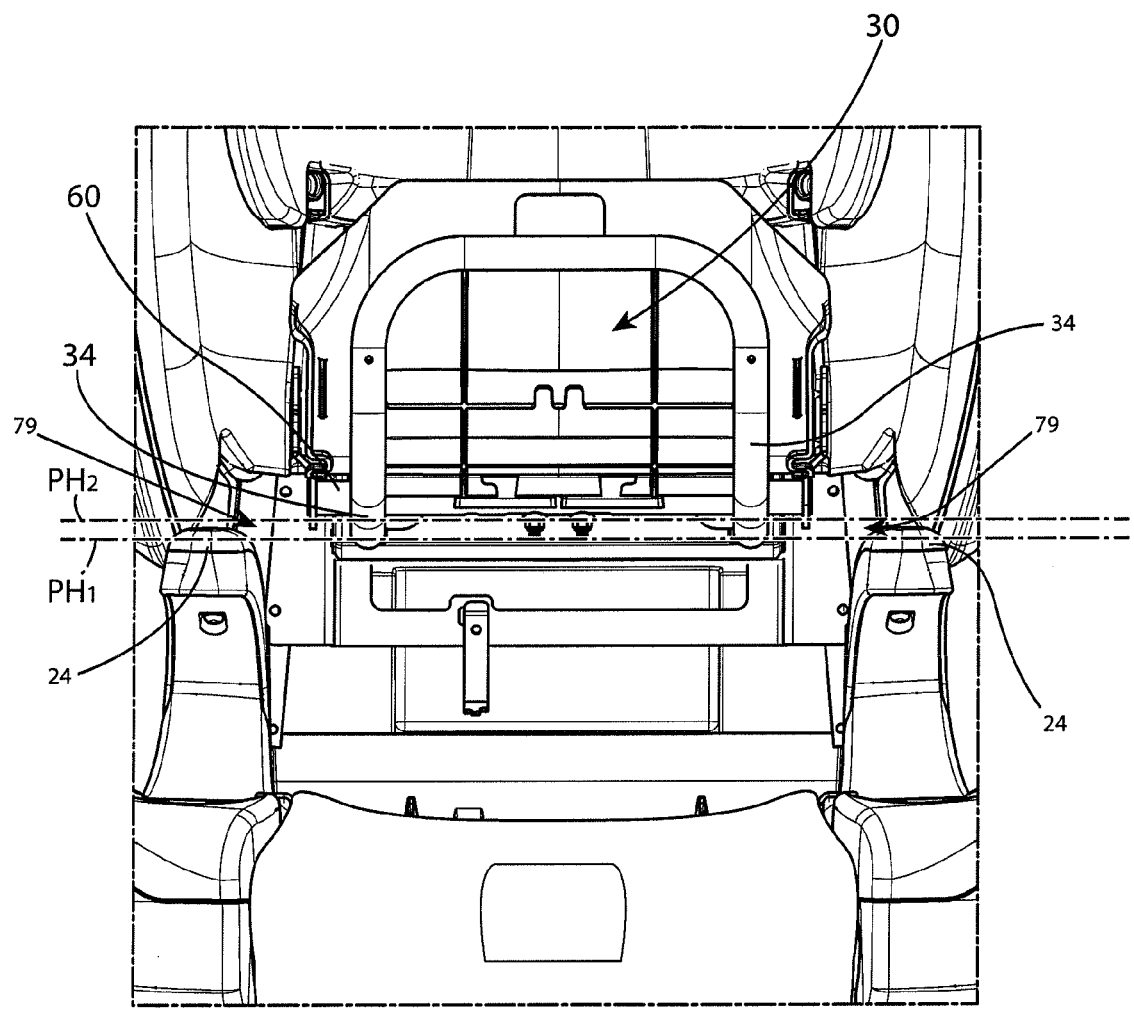
FIG. 3A shows a detailed view of the child seat and tensioning mechanism shown in FIG. 3, in accordance with an example embodiment of the present invention described herein.

Along these lines, in some embodiments, the child seat 10, and its components (e.g., tensioning mechanism 30, arm rests 22, 23, etc.) may define a belt path for easy positioning and engagement of the vehicle seat belt with the tensioning mechanism. In some embodiments, the belt path may comprise a belt guide channel that is configured to allow a user to easily position the vehicle seat belt for proper engagement with the tensioning mechanism. For example, in some embodiments, with reference to FIG. 3A, the seat base 12 may define a first arm rest 22 and a second arm rest 23. Each arm rest 22, 23 may define a top surface 24 that extends in a first horizontal plane $P_{H1}$. The tensioning mechanism 30 may define a bottom surface 34 that extends in a second horizontal plan $P_{H2}$ when the tensioning mechanism 30 is disposed in the second position. As shown in FIG. 3A, the second horizontal plane $P_{H2}$ may be configured to be above the first horizontal plane $P_{H1}$, such that the top surface 24 of each arm rest 22, 23 and the bottom surface 34 of the tensioning mechanism 30 define a belt guide channel 79 therebetween. The belt guide channel 79 may be configured to allow a user to easily position the vehicle seat belt between the top surface 24 of each arm rest 22, 23 and the bottom surface 34 of the tensioning mechanism 30, for example, by providing a space therebetween.

Additionally or alternatively, in some embodiments, other features may be used to define a belt path that allows for easy positioning and engagement of the vehicle seat belt with the tensioning mechanism. For example, in some embodiments, with reference to FIG. 1A, each arm rest 22, 23 may define a curved surface 108. The curved surface 108 may be configured to guide the vehicle seat belt into engagement with the tensioning mechanism 30 when the tensioning mechanism 30 is disposed in the second position (see e.g., the curved surface 108 shown in FIG. 7A).

While the depicted curved surface 108 provides a functional feature for guiding the portion of the vehicle seat belt into engagement with the tensioning mechanism, other curves, slopes, or adjustments may be made and are contemplated for embodiments of the present invention.

In some embodiments, the tensioning mechanism 30 may be configured to be locked in the first position (shown in FIGS. 1 and 2). Such a feature ensures that the tensioning mechanism 30 remains in the first position and prevents the full securement of the child seat 10 from being compromised. As such, in some embodiments, with reference to FIG. 3B, the tensioning mechanism 30 may comprise a locking mechanism 60. The structure and function of the locking mechanism 60 is illustrated in and described with respect to FIGS. 4, 4A, 4B, 5, and 5A. Though the locking mechanism 60 described herein has a specific structure and specific components, embodiments of the present invention contemplate use of other types of locking mechanisms with different structure.

Figure 3B:
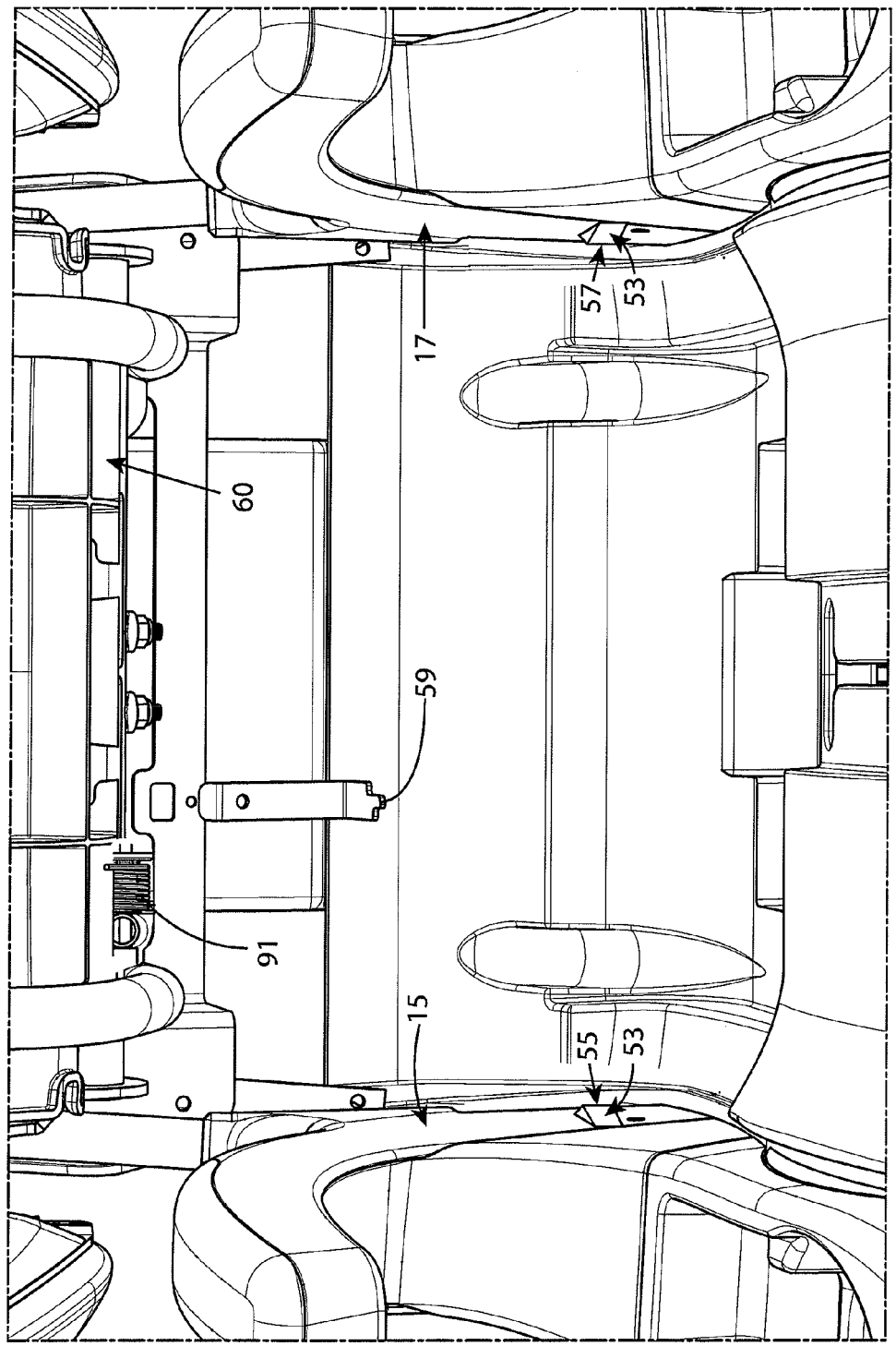
FIG. 3B shows a detailed perspective view of the child seat and tensioning mechanism shown in FIG. 3, in accordance with an example embodiment of the present invention described herein.

In some embodiments, the locking mechanism 60 may comprise two laterally-opposing locking members (e.g., bolts 61, 63) configured to translate between an extended position (FIG. 5A) and a retracted position (FIG. 5). As shown in FIG. 3B, the seat base 12 of the child seat 10 may define opposing side portions 15, 17. Additionally, each side portion 15, 17 may define a lock receiving portion 55, 57. Each lock receiving portion 55, 57 may be configured to receive a respective locking member 61, 63 when the tensioning mechanism 30 is in the first position and the locking members 62, 63 are in the extended position, thereby locking the tensioning mechanism 30 in the first position (shown in FIG. 2). In such a manner, the tensioning mechanism 30 will be locked and unable to be rotated out of the first position.

As shown in the depicted embodiment of FIG. 4, the locking mechanism 60 may comprise a cylindrical sleeve 66 that covers the components of the locking mechanism 60. The sleeve 66 may define openings that correspond to a first portion hole 62 and a second portion hole 64. Additionally, in some embodiments, the sleeve 66 may define a trigger opening 159 that, as will be described in greater detail herein, corresponds with a trigger 59 that is positioned on the seat base 12 (shown in FIG. 3B).

FIG. 4A illustrates the locking mechanism 60 with the sleeve 66 removed to show the components of the locking mechanism 60. In the depicted embodiment, the locking mechanism 60 comprises a first portion 72 and a second portion 74.

The first portion 72 may define a first portion hole 62 and a slot 83. Additionally, the first portion 72, in some embodiments, may be attached to a first locking member 61.

The second portion 74 may define a second portion hole 64 and a tab 92. The tab 92 may define a trigger member 95 and a retaining member 93. The tab 92 may be free at one end (e.g., a cantilever) such that it can bend in response to a force, such as may be applied to the trigger member 95 (e.g., a button). In such a manner, the tab 92, trigger member 95, and retaining member 93 may be configured to move between a trigger position (FIG. 5) and a withdrawn position (FIG. 5A). In some embodiments, whether due to the structure (e.g., material resistance) of the tab 92, or otherwise, the tab 92 may be biased to the trigger position. Additionally, the second portion 74, in some embodiments, may be attached to a second locking member 63.

The first portion 72 and second portion 74 may be configured to translate toward each other and away from each other along a longitudinal axis. In some embodiments, a portion of the first portion 72 may be configured to overlap a portion of the second portion 74 when in the retracted position. For example, with reference to FIG. 4B, the second portion 74 may be configured to translate under the first portion 72 such that the second portion hole 64, the tab 92, the trigger member 95, and the retaining member 93 are positioned within (e.g., behind) the slot 83 of the first portion 72 in the retracted position (as shown in FIG. 4A).

In some embodiments, the locking members 61, 63 may be biased toward the extended position. For example, with reference to FIG. 4A, a spring 76 may be positioned within the locking mechanism 60 to bias the first portion 72 and the second portion 74 apart such that the locking members 61, 63 are biased to extend outwardly.

In some embodiments, the retaining member 93 may be configured to retain the locking members 61, 63 in the retracted position, such as against the bias of spring 76. For example, with reference to FIG. 5, the retaining member 93 may define a protrusion that is defined proximate the free end of the tab 92. The retaining member 93, in the retracted position, may be configured to engage a stop surface 77 of the slot 83 of the first portion 72. In such a manner, the engagement of the retaining member 93 and the stop surface 77 prevents the translation of the first portion 72 and the second portion 74 away from each other and, thus, prevents translation of the locking members 61, 63 to the extended position. However, as will be described in greater detail herein, when the trigger member 95 is depressed, the retaining member 93 releases from engagement with the stop surface 77, thereby allowing the bias of the spring 76 to force the first portion 72 and the second portion 74 apart such that the locking members 61, 63 translate to the extended position (shown in FIG. 5A).

In some embodiments, the locking members 61, 63 of the locking mechanism 60 may be configured to automatically translate to the extended position when the tensioning mechanism 30 is rotated from the second position to the first position. Additionally, in some embodiments, the trigger member 95 may be configured to interact with the backrest portion 16 of the seat base 12 when the tensioning mechanism 30 is rotated to the first position to move the trigger member 95 from the trigger position (FIG. 5) to the withdrawn position (FIG. 5A). Additionally, in some embodiments, the trigger member 95 may be configured to cause the retaining member 93 to release the locking members 61, 63 in the withdrawn position.

For example, with reference to FIG. 3B, the backrest portion 16 of the seat base 12 may comprise a trigger 59 that protrudes outwardly from the seat base 12 toward the locking mechanism 60 when the locking mechanism 60 and tensioning mechanism 30 are disposed in the first position of FIG. 1. When the tensioning mechanism 30 and the locking mechanism 60 are rotated into the first position, the trigger 59 may be configured to protrude through the trigger opening 159 (shown in FIG. 4) in the sleeve 66 of the locking mechanism 60 and engage the trigger member 95 (FIG. 5) to release the retaining member 93 from engagement with the stop surface 77. With reference to FIG. 5, depression of the trigger member 95 causes the tab 92 to bend and, thus, release the retaining member 93 from engagement with the stop surface 77. In such a manner, the trigger member 95 moves from the trigger position (FIG. 5) to the withdrawn position (FIG. 5A). In the withdrawn position, the retaining member 93 and trigger member 95 may slide underneath the stop surface 77 as the first portion 72 and the second portion 74 translate away from each other (e.g., in the direction of arrows $B_1$ and $B_2$, respectively) due to the bias of the spring 76. This also causes the first locking member 61 and the second locking member 63 to translate (e.g., in the direction of arrows $B_1$ and $B_2$, respectively) from the retracted position (FIG. 5) to the extended position (FIG. 5A). With reference to FIG. 3B, the position of the trigger 59 may cause the locking members 61, 63 to be positioned proximate the locking receiving portions 55, 57 when release of the locking members 61, 63 occurs, thereby causing the locking members 61, 63 to engage their respective lock receiving portions 55, 57. As such, the tensioning mechanism 30 may become automatically locked with the seat base 12 when rotated into the first position.

As noted above, with reference to FIG. 2, the tensioning mechanism 30 may comprise a latch 80 with two pockets 82, 84 that are configured to each receive a finger of a user. The two pockets may be configured to translate toward each other to cause the locking members to move from the extended position to the retracted position, enabling a user to unlock the tensioning mechanism. The first pocket 82 may be connected to the first portion 72 of the locking mechanism 60, such as through the first portion hole 62 (e.g., an extension of the first pocket 82 may engage the first portion hole 62). The second pocket 84 may be connected to the second portion 74 of the locking mechanism 60, such as through the second portion hole 64 (e.g., an extension of the second pocket 84 may engage the second portion hole 64). Each pocket 82, 84 may receive a finger of a user (not shown). The user may translate the pockets 82, 84 toward each other (e.g., in the direction of arrow E). Due to the connection of each pocket 82, 84 to a respective first and second portion 72, 74, movement of the pockets 82, 84 toward each other causes movement of the first portion 72 and second portion 74 toward each other. Thus, a user may provide a translation force against the bias of the spring 76 to cause the first portion 72 and second portion 74 to translate toward each other (e.g., in the direction of arrow E), thereby causing the locking members 61, 63 to translate from the extended position (FIG. 5A) to the retracted position (FIG. 5).

Additionally, in some embodiments, translation of the first portion 72 and second portion 74 toward each other may cause the tab 92 and the retaining member 93 to translate to a position below the slot 83. In this way, the bias of the tab 92 may cause the tab 92 to return to the trigger position (FIG. 5), which causes the retaining member 93 to move to the trigger position and engage the stop surface 77 of the first portion 72. With the retaining member 93 engaged with the stop surface 77, the locking members 61, 63 are retained in the retracted position.

In some circumstances, even despite the bias of the tab 92 and retaining member 93 to retain the locking members 61, 63 in the retracted position, the locking members 61, 63 may be released (accidentally or otherwise) while the tensioning mechanism 30 is out of the first position. In such a situation, with the locking members 61, 63 in the extended position, it may be difficult to rotate the tensioning mechanism 30 into the first position due to the interference of the extended locking members 61, 63 with the respective lock receiving portions 55, 57 of the seat base 12. As such, in some embodiments, with reference to FIG. 3B, the seat base 12 may define a ramp 53 proximate each lock receiving portion 55, 57. The ramp 53 may be configured to enable the tensioning mechanism 30 to rotate from the second position to the first position when the locking members 61, 63 are in the extended position. For example, each ramp 53 may define a tapered surface that, when engaged by a locking member, causes each locking member 61, 63 to translate toward the retracted position until the tensioning mechanism 30 is able to rotate into the first position and then the each locking member 61, 63 may be able to translate to the extended position to engage with a respective lock receiving portion 55, 57.

As noted above, some example embodiments of the present invention provide a tensioning mechanism for a child seat that is configured to enable easy and full securing of the child seat to a car seat with a vehicle seat belt (e.g., the child seat is easily secured in a tensioned configuration by the user).

As used herein, in some embodiments, the vehicle seat belt may be also referred to as a belt or seat belt. Additionally, in some embodiments, reference to a vehicle seat belt, seat belt, or belt may include both a lap section and a shoulder section of the belt of the car seat. Moreover, while the depicted embodiments detail the use of both a lap section and a shoulder section of the belt of a car seat, other embodiments may only use a lap section or a shoulder section for securement of the child seat. Along these same lines, while the depicted embodiment is described with respect to a car seat, other vehicles or surfaces using belts for securement are contemplated. Indeed, the present invention is not meant to be limited to cars.

In such a regard, in some embodiments, the seat base of the child seat may be configured to receive an untensioned belt of a car seat to secure the child seat in an untensioned configuration. For example, with reference to FIG. 6, the seat base 12 of the child seat 10 may be configured to receive an untensioned belt 25 of a car seat 28, such as to be engaged with the tensioning mechanism 30, when the tensioning mechanism 30 is disposed in the second position.

As noted above, in some embodiments, the belt 25 may define a lap section 27 and a shoulder section 29. The lap section 27 may define a portion of the belt 25 that extends from a lower anchor on a vehicle (not shown) to a buckle 221 (shown in FIG. 6A) such that it defines the portion of the belt 25 that would pass over the lap of a car seat occupant. The shoulder section 29 may define a portion of the belt 25 that extends from an upper anchor on a vehicle (not shown) to the buckle 221 (shown in FIG. 6A) such that it defines the portion of the belt 25 that would pass across a shoulder of a car seat occupant.

In some embodiments, in the second position, the tensioning mechanism 30 may be configured to receive a portion of the belt 25. Additionally, in the depicted embodiment of FIG. 6A, the tensioning mechanism 30 is configured to receive a portion of the lap section 27 of the belt 25 and a portion of the shoulder section 29 of the belt. As noted above, the portion of the belt 25 may be received along a belt path, such as within the belt guide channel 79. Once the portion of the belt 25, such as the portion of the lap section 27 and the portion of the shoulder section 29, have been received by the tensioning mechanism 30, the buckle 221 of the belt 25 may be engaged with a buckle 21 of the car seat 28. In such a manner, the untensioned belt 25 of the car seat 28 has secured the child seat 10 in an untensioned configuration. For example, in some embodiments, slack may remain in the belt 25 such that the child seat 10 is not fully secured to the car seat 28.

A further example of the child seat 10 not being fully secured to the car seat 28 is illustrated in FIG. 7A. While the belt 25 has been received by the tensioning mechanism 30 and latched with the buckle 21 of the car seat 28, a space 112 may remain between the backrest portion 16 of the seat base 12 and the backrest portion 113 of the car seat 28. Such space 112 may be detrimental to the safety of an occupant of the child seat 10 and may lead to harm during a sudden deceleration, such as during a vehicle impact.

In some embodiments, once the belt 25 is engaged with the tensioning mechanism 30, the tensioning mechanism 30 may be rotated into the first position to apply tension to a portion of the belt 25 to secure the child seat to the car seat in a tensioned configuration. For example, with reference to FIG. 7, the tensioning mechanism 30 may be rotated (e.g., in the direction of arrow C) to apply tension to the portion of the lap section 25 and the portion of the shoulder section 29 of the belt 25 engaged with the tensioning mechanism 30. With reference to FIG. 8, once the tensioning mechanism 30

(shown in FIG. 7) is rotated into the first position, the tension applied to the portion of the belt 25 causes the child seat 10 to secure to the car seat 28 in a tensioned configuration.

In some embodiments, the tensioning mechanism 30 may be configured to rotate, in response to receiving a substantially vertical force, from the second position to the first position to apply tension to the portion of the belt 25. In such an embodiment, a user may simply push substantially straight down to effectuate fully secure installation of the child seat to a car seat (e.g., the user may push down to install the child seat in a tensioned configuration). For example, with reference to FIG. 7A, a user 230 may provide a substantially vertical force (e.g., in the direction of arrow F) to the tensioning mechanism 30, such as with their hand 231. The substantially vertical force may cause the tensioning mechanism 30 to rotate from the second position (FIG. 7A) to the first position (FIG. 8A).

In some embodiments, with reference to FIG. 8A, due to the applied tension on the portion of the belt 25 from the tensioning mechanism 30, the child seat 10 may be pulled tightly (e.g., in the direction of arrow D) to the backrest portion 113 of the car seat 28. In contrast, with reference to FIG. 7A, before rotation of the tensioning mechanism 30, a space 112 may exist between the backrest portion 16 of the seat base 12 and the backrest portion 113 of the car seat 28.

In some embodiments, the tension applied to the portion of the belt 25 may be the result of displacement of the portion of the belt 25 that is engaged with the tensioning mechanism 30. Such displacement may cause an increased tension in the belt 25, which may cause the child seat 10 to more fully secure to the car seat 28 (e.g., the tensioned configuration shown in FIG. 8A). For example, with reference to FIG. 6A, the portion of the lap section 27 and the shoulder section 29 of the belt 25 may extend substantially in a horizontal plane ($H_{P3}$) from the first arm rest 22 to the second arm rest 23. However, once the tensioning mechanism 30 has been rotated into the first position (e.g., in the direction of arrow C as illustrated in FIG. 7A), the portion of the lap section 27 and the portion of the shoulder section 29 of the belt 25 may be displaced by the bottom surface 34 of the tensioning mechanism 30 (e.g., out of the horizontal plane ($H_{P3}$) (shown in FIG. 6A)) such that the portion of the lap section 27 and the shoulder section 29 of the belt 25 are substantially adjacent to the backrest portion 16 of the seat base 12. In such a manner, the distance between the horizontal plane ($H_{P3}$) and the new plane of the portion of the lap section 27 and the shoulder section 29 (e.g., substantially adjacent to bottom surface 34 of the tensioning mechanism 30 and the backrest portion 16 of the seat base 12) may define the distance of displacement of the portion of the belt 25.

In some embodiments, with reference to FIG. 8A, the portion of the belt 25 may be displaced from a position proximate a surface of the arm rest. For example, in the depicted embodiment, the distance of displacement of the portion of the belt 25 is the distance between the angled surface 110 of the arm rest 22, 23 and the bottom surface 34 of the tensioning mechanism 30 (not shown) when the tensioning mechanism 30 is disposed in the first position.

In some embodiments, the angled surface 110 may be configured to adjacently engage and align the portion of the belt 25 when the child seat 10 is in the tensioned configuration. For example, in the depicted embodiment of FIG. 7A, the portion of the belt 25 may fit on the angled surface 110, which may cause the portion of the belt 25 to be properly aligned during rotation of the tensioning mechanism 30 from the second position (FIG. 7A) to the first position (FIG. 8A) such that the portion of the belt 25 is properly received within the child seat 10 when the child seat 10 is in the tensioned configuration.

While the depicted angled surface 110 provides a functional feature of alignment of the belt of the car seat, other angles or adjustments may be made and are contemplated for embodiments of the present invention.

Some example embodiments of the present invention contemplate a method of manufacturing a child seat comprising any components or any embodiments described herein. For example, in some embodiments, a method of manufacturing a child seat configured to be secured to a car seat may comprise providing a seat base as described herein and attaching a tensioning mechanism as described herein to the seat base. The seat base and tensioning mechanism may be configured at least as described herein with respect to any embodiments or combination of embodiments.

Along these same lines, some example embodiments of the present invention contemplate any combination of embodiments or components described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed. Although specific terms are employed herein, they are used in a generic and descriptive sense only and not for purposes of limitation.

What is claimed is:

1. A child seat configured to be secured to a seat of a car, the child seat comprising:

a seat base defining a seat portion and a backrest portion, wherein the backrest portion defines a front side and a rear side, wherein the seat portion defines a top side and a bottom side, wherein the seat base is configured to be positioned on the seat of the car such that the rear side of the backrest portion is positioned adjacent a backrest portion of the seat of the car and the bottom side of the seat portion is positioned adjacent a seat portion of the seat of the car, wherein the seat base is further configured to receive a belt of the seat of the car such that the belt is positioned around at least one of the front side of the backrest portion or the top side of the seat portion and the belt is engaged with a buckle of the seat of the car to secure the child seat to the seat of the car in an untensioned configuration, wherein the belt defines a lap section and a shoulder section; and a tensioning mechanism attached to the backrest portion of the seat base, wherein the tensioning mechanism is rotatable between a first position substantially adjacent to at least the backrest portion of the seat base and a second position disposed therefrom, wherein, in the second position, the tensioning mechanism is configured to receive a portion of the lap section of the belt and a portion of the shoulder section of the belt, wherein, in the first position, the tensioning mechanism is configured to apply tension to the portion of the lap section and the portion of the shoulder section of the belt to secure the child seat to the seat of the car in a tensioned configuration, wherein, when in the first position, the tensioning mechanism defines a generally vertical orientation, and wherein, when in the second position, the tensioning mechanism defines a generally horizontal orientation.

2. The child seat according to claim 1, wherein the tensioning mechanism is configured to rotate, in response to receiving a substantially vertical force, from the second position to the first position to apply tension to the portion of the lap section and the portion of the shoulder section of the belt to secure the child seat to the seat of the car in the tensioned configuration.

3. The child seat according to claim 1, wherein the seat base further defines a first arm rest and a second arm rest, wherein a top surface of each arm rest extends in a first horizontal plane, and wherein, in the second position, a bottom surface of the tensioning mechanism extends in a second horizontal plane, wherein the second horizontal plane is above the first horizontal plane such that the top surface of each arm rest and the bottom surface of the tensioning mechanism define a belt guide channel configured to allow a user to position the portion of the lap section and the portion of the shoulder section of the belt therebetween.

4. The child seat according to claim 3, wherein each arm rest defines a curved surface that is configured to guide the portion of the lap section and the portion of the shoulder section of the belt into engagement with the tensioning mechanism when the tensioning mechanism is disposed in the second position.

5. The child seat according to claim 1, wherein the seat base further defines a first arm rest and a second arm rest, wherein each arm rest defines an angled surface proximate the backrest position, wherein the angled surface is configured to adjacently engage and align the portion of the lap section and the portion of the shoulder section of the belt when the child seat is in the tensioned configuration.

6. The child seat according to claim 1 further comprising a harness defining a first belt and a second belt, wherein the first belt and the second belt each extend from the backrest portion at a first end to a second end that is fixedly attached to the tensioning mechanism, wherein the second ends of the first belt and the second belt of the harness are each configured to rotate with the tensioning mechanism between the first position and the second position.

7. The child seat according to claim 1, wherein the seat base further defines opposing side portions, wherein each side portion comprises a lock receiving portion, wherein the tensioning mechanism further comprises:
a locking mechanism comprising two laterally-opposing locking members configured to translate between an extended position and a refracted position, wherein each lock receiving portion is configured to receive a respective locking member when the tensioning mechanism is in the first position and the locking members are in the extended position, thereby locking the tensioning mechanism in the first position, and wherein the locking members are configured to automatically translate to the extended position when the tensioning mechanism is rotated from the second position to the first position.

8. The child seat according to claim 7, wherein the locking members are biased toward the extended position, wherein the locking mechanism comprises a retaining member and a trigger member, wherein the retaining member is configured to retain the locking members in the refracted position, wherein the trigger member is configured to interact with the backrest portion of the seat base when the tensioning mechanism is rotated to the first position to move the trigger member from a trigger position to a withdrawn position, and wherein the trigger member is configured to cause the retaining member to release the locking members in the withdrawn position.

9. The child seat according to claim 7, wherein the locking mechanism comprises a latch configured to enable a user to translate the locking members from the extended position to the retracted position.

10. The child seat according to claim 9, wherein the latch defines two pockets that are configured to each receive a finger of a user, wherein the two pockets are configured to translate toward each other to cause the locking members to move from the extended position to the retracted position.

11. The child seat according to claim 7, wherein the seat base defines a ramp proximate each lock receiving portion, wherein the ramp is configured to engage and at least partially retract the locking members from the extended position to enable the tensioning mechanism to rotate from the second position to the first position.

12. A method for manufacturing a child seat configured to be secured to a seat of a car, the method comprising:
providing a seat base defining a seat portion and a backrest portion, wherein the backrest portion defines a front side and a rear side, wherein the seat portion defines a top side and a bottom side, wherein the seat base is configured to be positioned on the seat of the car such that the rear side of the backrest portion is positioned adjacent a backrest portion of the seat of the car and the bottom side of the seat portion is positioned adjacent a seat portion of the seat of the car, wherein the seat base is further configured to receive a belt of the seat of the car seat such that the belt is positioned around at least one of the front side of the backrest portion or the top side of the seat portion and the belt is engaged with a buckle of the seat of the car to secure the child seat to the seat of the car in an untensioned configuration, wherein the belt defines a lap section and a shoulder section; and
attaching a tensioning mechanism to the seat base, wherein the tensioning mechanism is rotatable between a first position substantially adjacent to at least the backrest portion of the seat base and a second position disposed therefrom, wherein, in the second position, the tensioning mechanism is configured to receive a portion of the lap section of the belt and a portion of the shoulder section of the belt, wherein, in the first position, the tensioning mechanism is configured to apply tension to the portion of the lap section of the belt and the portion of the shoulder section of the belt to secure the child seat to the seat of the car in a tensioned configuration, wherein, when in the first position, the tensioning mechanism defines a generally vertical orientation, and wherein, when in the second position, the tensioning mechanism defines a generally horizontal orientation.

13. The child seat according to claim 1, wherein the seat base defines padding positioned on and attached to the backrest portion and the seat portion so as to receive an occupant therein, wherein the tensioning mechanism is accessible and rotatable between the first position and the second position with the padding attached to the backrest portion.

14. The child seat according to claim 1, wherein the seat base is configured to receive the belt of the seat of the car such that the belt can be positioned around the backrest portion and seat portion and engaged with the buckle of the seat of the car without feeding the belt through a hole in the seat base.

15. A child seat configured to be secured to a seat of a car, the child seat comprising:
a seat base defining a seat portion and a backrest portion, wherein the seat base is configured to receive a belt of the seat of the car to secure the child seat to the seat of the car in an untensioned configuration, wherein the belt defines a lap section and a shoulder section; and
a tensioning mechanism attached to the backrest portion of the seat base, wherein the tensioning mechanism is rotatable between a first position substantially adjacent to at least the backrest portion of the seat base and a second position disposed therefrom, wherein, in the second position, the tensioning mechanism is configured to receive a portion of the lap section of the belt and a portion of the shoulder section of the belt in a horizontal plane defined by the tensioning mechanism and at least one of the seat portion or the backrest portion, wherein, in the first position, the tensioning mechanism is configured to displace the portion of the lap section and the portion of the shoulder section of the belt out of the horizontal plane to apply tension to the belt and secure the child seat to the seat of the car in a tensioned configuration, wherein, when in the first position, the tensioning mechanism defines a generally vertical orientation, and wherein, when in the second position, the tensioning mechanism defines a generally horizontal orientation.

16. The child seat according to claim 15, wherein, when in the first portion, a second portion of the lap section of the belt and a second portion of the shoulder section of the belt remains positioned in the horizontal plane such that additional tension is applied to the belt to secure the child seat to the seat of the car in the tensioned configuration.

17. The child seat according to claim 16, wherein the seat base further defines an arm rest that is configured to engage with the second portion of the lap section of the belt and the second portion of the shoulder section of the belt in the horizontal plane when the tensioning mechanism is in the first position.

18. The child seat according to claim 15, wherein the tensioning mechanism is configured to rotate, in response to receiving a substantially vertical force, from the second position to the first position to apply tension to the portion of the lap section and the portion of the shoulder section of the belt to secure the child seat to the car set in the tensioned configuration.

19. A method for manufacturing a child seat configured to be secured to a seat of a car, the method comprising:

providing a seat base defining a seat portion and a backrest portion, wherein the seat base is configured to receive a belt of the seat of the car seat to secure the child seat to the seat of the car in an untensioned configuration, wherein the belt defines a lap section and a shoulder section; and attaching a tensioning mechanism to the seat base, wherein the tensioning mechanism is rotatable between a first position substantially adjacent to at least the backrest portion of the seat base and a second position disposed therefrom, wherein, in the second position, the tensioning mechanism is configured to receive a portion of the lap section of the belt and a portion of the shoulder section of the belt in a horizontal plane defined by the tensioning mechanism and at least one of the seat portion or the backrest portion, wherein, in the first position, the tensioning mechanism is configured to displace the portion of the lap section of the belt and the portion of the shoulder section of the belt out of the horizontal plane to apply tension to the belt and secure the child seat to the seat of the car in a tensioned configuration, wherein, when in the first position, the tensioning mechanism defines a generally vertical orientation, and wherein, when in the second position, the tensioning mechanism defines a generally horizontal orientation.

* * * * *